US012565136B2

(12) United States Patent
King et al.

(10) Patent No.: US 12,565,136 B2
(45) Date of Patent: Mar. 3, 2026

(54) WEB RETRACTOR WITH SIDE, TOP OR BOTTOM WEB EXIT

(71) Applicant: INDIANA MILLS & MANUFACTURING, INC., Westfield, IN (US)

(72) Inventors: Jeffrey A. King, Markleville, IN (US); Thomas Mashino, Kokomo, IN (US)

(73) Assignee: INDIANA MILLS & MANUFACTURING, INC., Westfield, IN (US)

( * ) Notice: Subject to any disclaimer, the term of this patent is extended or adjusted under 35 U.S.C. 154(b) by 839 days.

(21) Appl. No.: 17/788,349

(22) PCT Filed: Jan. 15, 2021

(86) PCT No.: PCT/US2021/013542
§ 371 (c)(1),
(2) Date: Jun. 23, 2022

(87) PCT Pub. No.: WO2021/146498
PCT Pub. Date: Jul. 22, 2021

(65) Prior Publication Data
US 2023/0025300 A1     Jan. 26, 2023

Related U.S. Application Data

(60) Provisional application No. 62/962,180, filed on Jan. 16, 2020.

(51) Int. Cl.
*B60P 7/08*          (2006.01)
*B65H 18/10*         (2006.01)
(Continued)

(52) U.S. Cl.
CPC ............. *B60P 7/083* (2013.01); *B60P 7/0846* (2013.01); *B65H 18/10* (2013.01); *B65H 23/00* (2013.01);
(Continued)

(58) Field of Classification Search
CPC .... B60R 2022/3402; B60R 2022/3427; B60R 2022/1818; B60R 2022/4841;
(Continued)

(56) References Cited

U.S. PATENT DOCUMENTS 9,987,969 B1 *   6/2018   Welter ..................... B60P 7/08
2005/0205709 A1   9/2005   Kohlindorfer et al.
(Continued)

FOREIGN PATENT DOCUMENTS

| WO | WO-2013020120 A1 * | 2/2013 | ............. B60R 22/34 |
| WO | WO-2014179468 A1 * | 11/2014 | ........... A44B 11/125 |
| WO | WO-2018145802 A1 * | 8/2018 | ............. B60P 7/083 |

OTHER PUBLICATIONS

PCT International Search Report and Written Opinion completed by the ISA/US on May 14, 2021 and issued in connection with PCT/US2021/013542.
(Continued)

*Primary Examiner* — Amy R Weisberg
(74) *Attorney, Agent, or Firm* — Barnes & Thornburg LLP

(57)          ABSTRACT

A web retractor may include a frame with spaced-apart first and second side walls and a bottom wall coupling together the side walls, the frame defining an opening through the first side wall, the second side wall or the bottom wall, a spool rotatably mounted to and between the first and second side walls and spaced apart from the opening, a web having one end mounted to the spool, the spool being rotatable to take up and pay out at least some of the web, and a web
(Continued)

deflector mounted to at least one of the first side wall, the second sidewall and the bottom wall and positioned between the spool and the opening, the web deflector configured to guide the web from the spool out of the web retractor through the opening and to guide the web into the retractor and to the spool through the opening.

21 Claims, 29 Drawing Sheets

(51) Int. Cl.
    *B65H 23/00*       (2006.01)
    *B65H 75/42*       (2006.01)
    *B65H 75/44*       (2006.01)
(52) U.S. Cl.
    CPC ....... *B65H 75/425* (2013.01); *B65H 75/4428*
           (2013.01); *B65H 75/4494* (2013.01)
(58) Field of Classification Search
    CPC ... B60R 22/405; B60R 22/347; B60R 22/343;
            B60R 22/44; B60R 22/40; B60R 22/38;
            B60R 22/34; B60R 22/18; B60R 22/28;
            B60R 22/48; A62B 35/0093; B60P 7/083;
            B60P 7/0846; B65H 18/10; B65H 23/00

USPC ........................................................ 410/100
See application file for complete search history.

(56) References Cited

U.S. PATENT DOCUMENTS

| | | | | |
|---|---|---|---|---|
| 2013/0270380 | A1* | 10/2013 | Ellison ................... | B60R 22/34 |
| | | | | 242/379 |
| 2014/0028075 | A1* | 1/2014 | Kohlndorfer ........... | B60R 22/34 |
| | | | | 297/475 |
| 2014/0054405 | A1* | 2/2014 | Clark ...................... | B60R 22/34 |
| | | | | 242/384 |
| 2015/0108263 | A1* | 4/2015 | Suminaka ............. | B60R 22/405 |
| | | | | 242/379.1 |
| 2019/0263352 | A1* | 8/2019 | Geist ................... | B60R 22/3416 |

OTHER PUBLICATIONS

International Preliminary Report on Patentability and Written Opinion for International Application No. PCT/US2021/013542 issued Jul. 19, 2022.

* cited by examiner

WEB RETRACTOR WITH SIDE, TOP OR BOTTOM WEB EXIT

CROSS-REFERENCE TO RELATED APPLICATIONS

This application is a U.S. national stage entry of PCT Application No. PCT/US2021/013542, filed Jan. 15, 2021, which claims the benefit of and priority to U.S. Provisional Patent Application Ser. No. 62/962,180, filed Jan. 16, 2020, the disclosures of which are incorporated herein by reference in their entireties.

TECHNICAL FIELD

The present disclosure relates generally to web retractors, and more specifically, but not exclusively, to ratcheting web retractors.

BACKGROUND

Web retractors are known, some examples of which include automatic locking retractors (ALRs) and emergency locking retractors (ELRs), and other examples of which include various embodiments of so-called ratcheting web retractors. In addition to being lockable, i.e., such that the web is prevented from being taken out in a web pay out direction, ratcheting web retractors are generally configured to provide for ratcheting of the web, once locked, in a web take up direction to thereby incrementally shorten the length of the web between the retractor and the paid out end of the web.

SUMMARY

The present disclosure may comprise one or more of the features recited in the attached claims, and/or one or more of the following features and combinations thereof. In one aspect, a web retractor may comprise a frame including spaced-apart first and second side walls and a bottom wall coupling together the first and second side walls, the frame defining an elongated channel extending from one end of the frame to an opposite end of the frame between the first and second side walls and the bottom wall, a spool rotatably mounted within the channel to and between the first and second side walls, a web having one end mounted to the spool, the spool being rotatable to take up and pay out at least some of the web, and a web deflector spaced apart from the spool and mounted within the channel to at least one of the first side wall, the second sidewall and the bottom wall, the web deflector configured to guide the web to and from the spool longitudinally along the channel between the web deflector and the spool, and to guide the web into and out of the frame through the first side wall, the second side wall, the bottom wall or through a top of the frame opposite the bottom wall.

In another aspect, a web retractor, may comprise a frame including spaced-apart first and second side walls, a bottom wall coupling together the first and second side walls, the frame defining an opening through the first side wall, the second side wall or the bottom wall, a spool rotatably mounted to and between the first and second side walls and spaced apart from the opening, a web having one end mounted to the spool, the spool being rotatable to take up and pay out at least some of the web, and a web deflector mounted to at least one of the first side wall, the second sidewall and the bottom wall and positioned between the spool and the opening, the web deflector configured to guide the web from the spool out of the web retractor through the opening and to guide the web into the retractor and to the spool through the opening.

In a further aspect, a web retractor may comprise a frame including spaced-apart first and second side walls and a bottom wall coupling together the first and second side walls, a spool rotatably mounted to and between the first and second side walls such that the spool rotates relative to the first and second side walls about a spool axis, a web having one end mounted to the spool, the spool being rotatable to take up and pay out at least some of the web, and a web deflector spaced apart from the spool and mounted to at least one of the first side wall, the second sidewall and the bottom wall, the web deflector configured to guide the web within the frame to and from the spool along a plane normal to the spool axis, and to guide the web into and out of the frame through the first side wall, the second side wall, the bottom wall or through a top of the frame opposite the bottom wall.

In yet another aspect, a motor vehicle and web retractor combination may comprise a motor vehicle having a cargo area bounded by at least one retaining wall, the at least one retaining wall having an opening defined therein, and a web retractor including a frame and a face plate mounted to the frame, wherein the web retractor is sized and configured to be mounted in the opening of the at least one retaining wall with the face plate flush with or recessed relative to an externally-facing surface of the at least one retaining wall. The web retractor may additionally include any combination of the web retractor structures and/or features described in detail below.

DESCRIPTION OF THE ILLUSTRATIVE EMBODIMENTS

Figure 1:
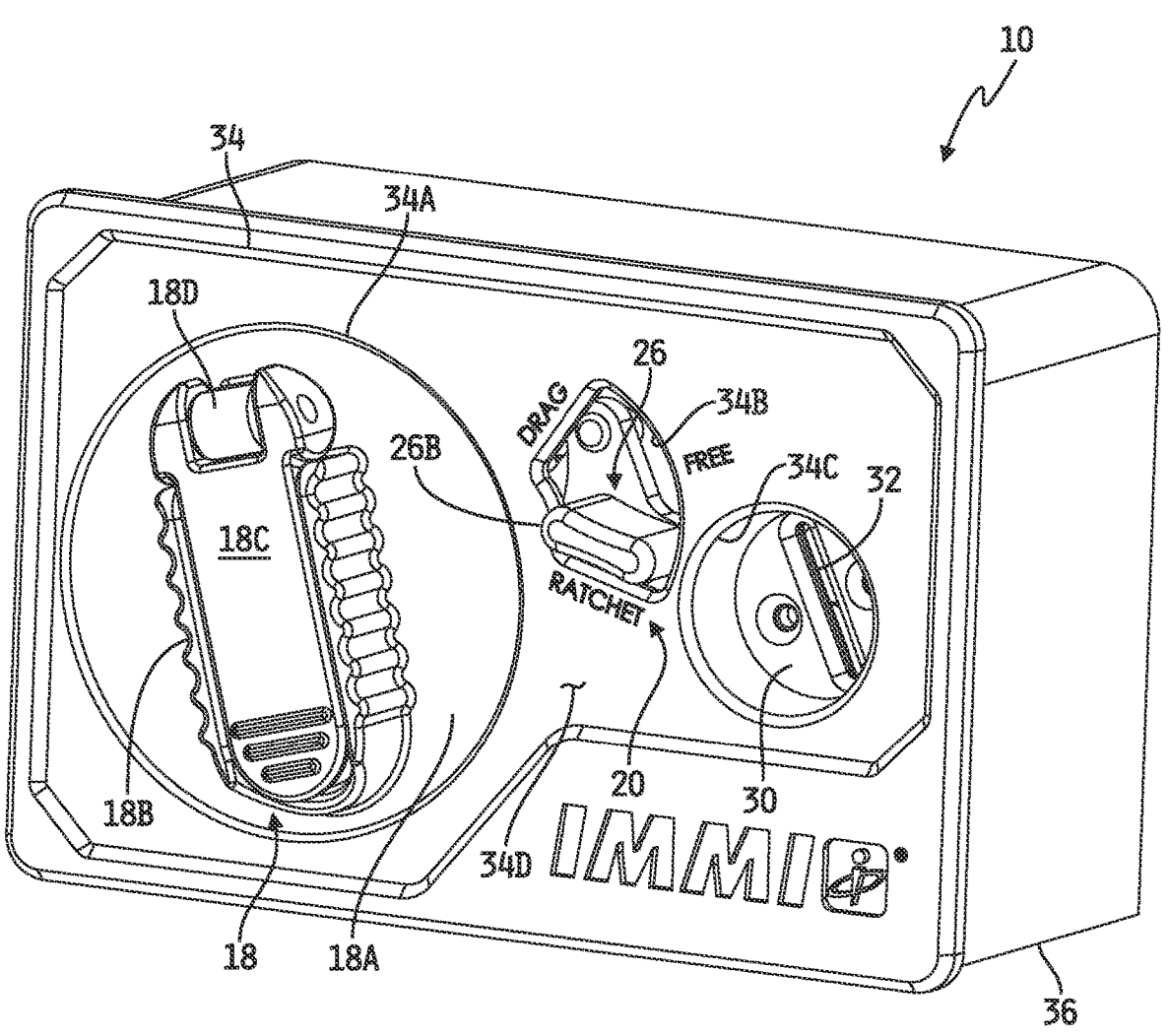
FIG. 1 is a front perspective view of an embodiment of a web retractor with a side web exit shown with a mode selection switch in a web ratchet position.
Figure 2:
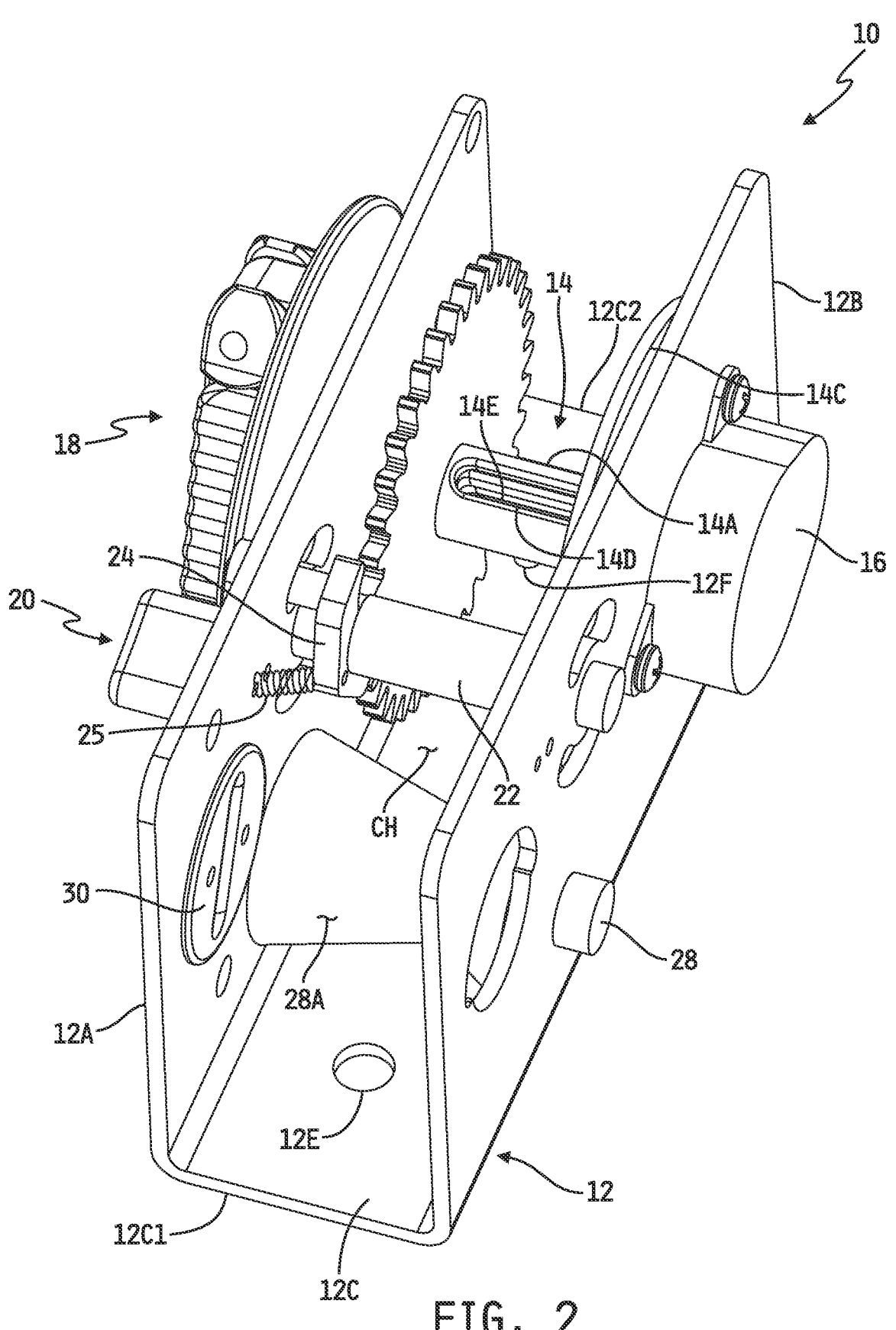
FIG. 2 is a rear perspective view of the web retractor of FIG. 1 shown with the cover and face plate removed to illustrate various components of the web retractor.

For the purposes of promoting an understanding of the principles of this disclosure, reference will now be made to a number of illustrative embodiments shown in the attached drawings and specific language will be used to describe the same.

This disclosure relates to a web retractor having a web coupled to a spool that is rotatably mounted to and between spaced-apart frame side walls coupled together by a bottom frame wall, wherein the web retractor is configured such that the web exits from a side, bottom or top of the retractor. Referring now to FIGS. 1-14, an embodiment is shown of a web retractor 10 having a side web exit 32. The web retractor 10 illustrated by example in FIGS. 1-14 is provided in the form of a so-called ratcheting web retractor (sometimes referred to as a ratcheting tie down, retractable ratchet tie down device or strap, ratcheting cargo strap or the like). It will be understood, however, that the concepts illustrated in the attached figures and described herein may be implemented in any conventional spooling web retractor, ratcheting or non-ratcheting, to effectuate a side, top or bottom web exit as described below.

Referring specifically to FIGS. 2-5, the web retractor 10 includes a frame 12 having a pair of spaced-apart, upstanding side walls 12A, 12B each extending away from and coupled together by a base or bottom wall 12C of the frame 12. Illustratively, the sidewalls 12A and 12B are substantially parallel with one another, although in some alternate embodiments the sidewalls 12A, 12B may be non-parallel. In any case, a channel CH is defined between the sidewalls 12A and 12B and the bottom wall 12C, and a spool 14 is rotatably mounted within the channel CH to and between the sidewalls 12A and 12B in a conventional manner such that the spool 14 is rotatable relative to the sidewalls 12A, 12B about a spool axis A. The bottom wall 12C of the frame 12 illustratively defines openings 12E, 12F therethrough each sized to receive a fastening member therethrough to secure the frame 12, and thus the retractor 10, to a support structure or surface. It will be understood, however, that either or both of the side walls 12A, 12B of the frame may alternatively or additionally define one or more openings therethrough sized to receive a fastening member therethrough to alternatively or additionally secure the frame 12, and thus the retractor 10, to one or more alternate or additional support structures. In the illustrated embodiment, the frame 12 is generally elongated and the bottom wall 12C extends from one end 12C1 thereof to an opposite end 12C2 thereof (see, e.g., FIG. 2), with the respective ends of the side walls 12A, 12B being coterminous with the bottom wall ends 12C1, 12C2 such that the channel CH defined by the side walls 12A, 12B and bottom wall 12C of the frame 12 is an elongated channel CH which extends longitudinally between the respect ends of the side walls 12A, 12B and which is open at the top of the frame 12. In alternate embodiments, however, the end 12C1 of the bottom wall 12C may extend beyond, or stop short of, the respective end(s) of either or both of the side walls 12A, 12B and/or the end 12C2 of the bottom wall 12C may extend beyond, or stop short of, the respective end(s) of either or both of the side walls 12A, 12B.

Figure 4:
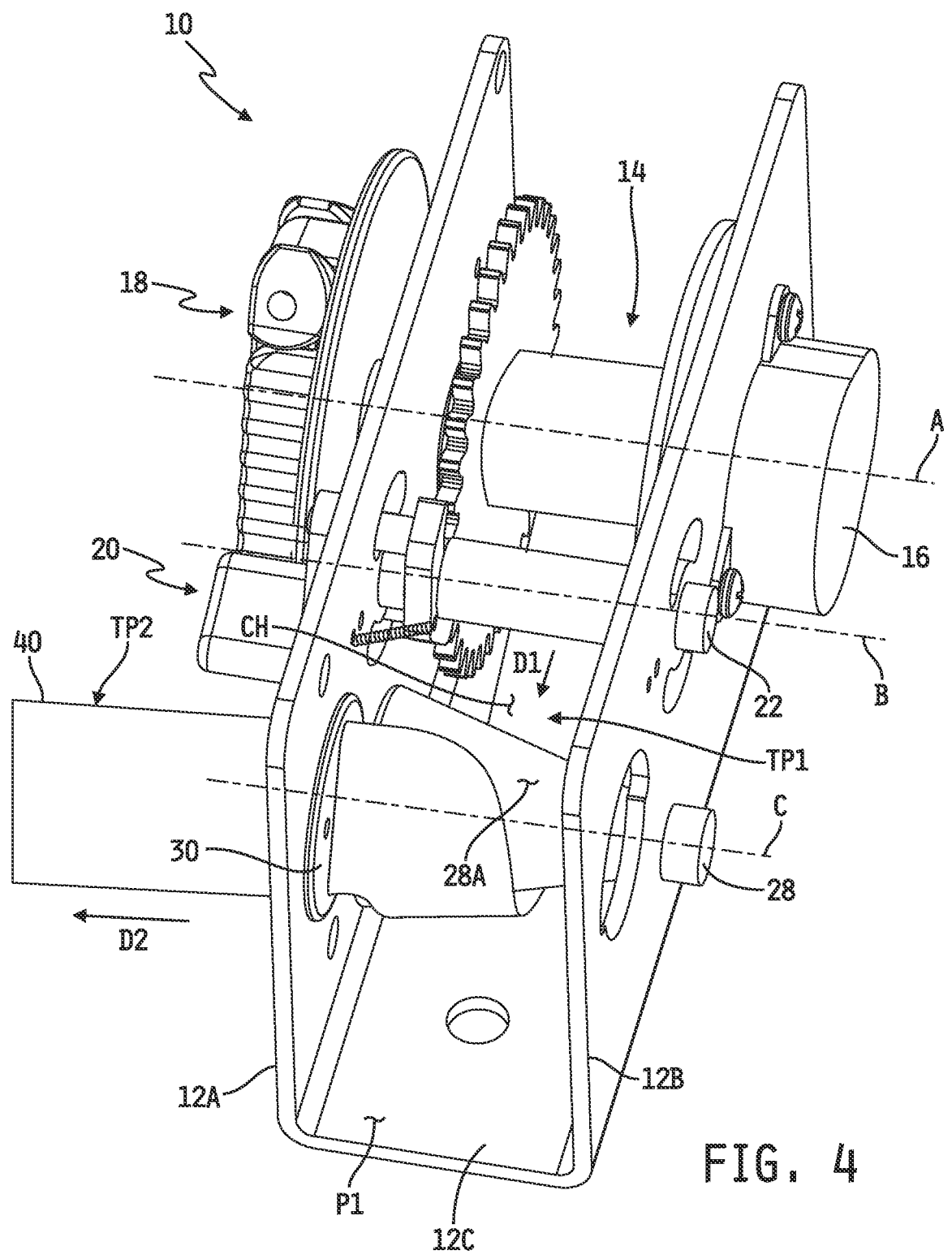
FIG. 4 is a rear perspective view similar to FIG. 2 and further illustrating a restraint web operatively coupled to the web retractor.
Figure 5:
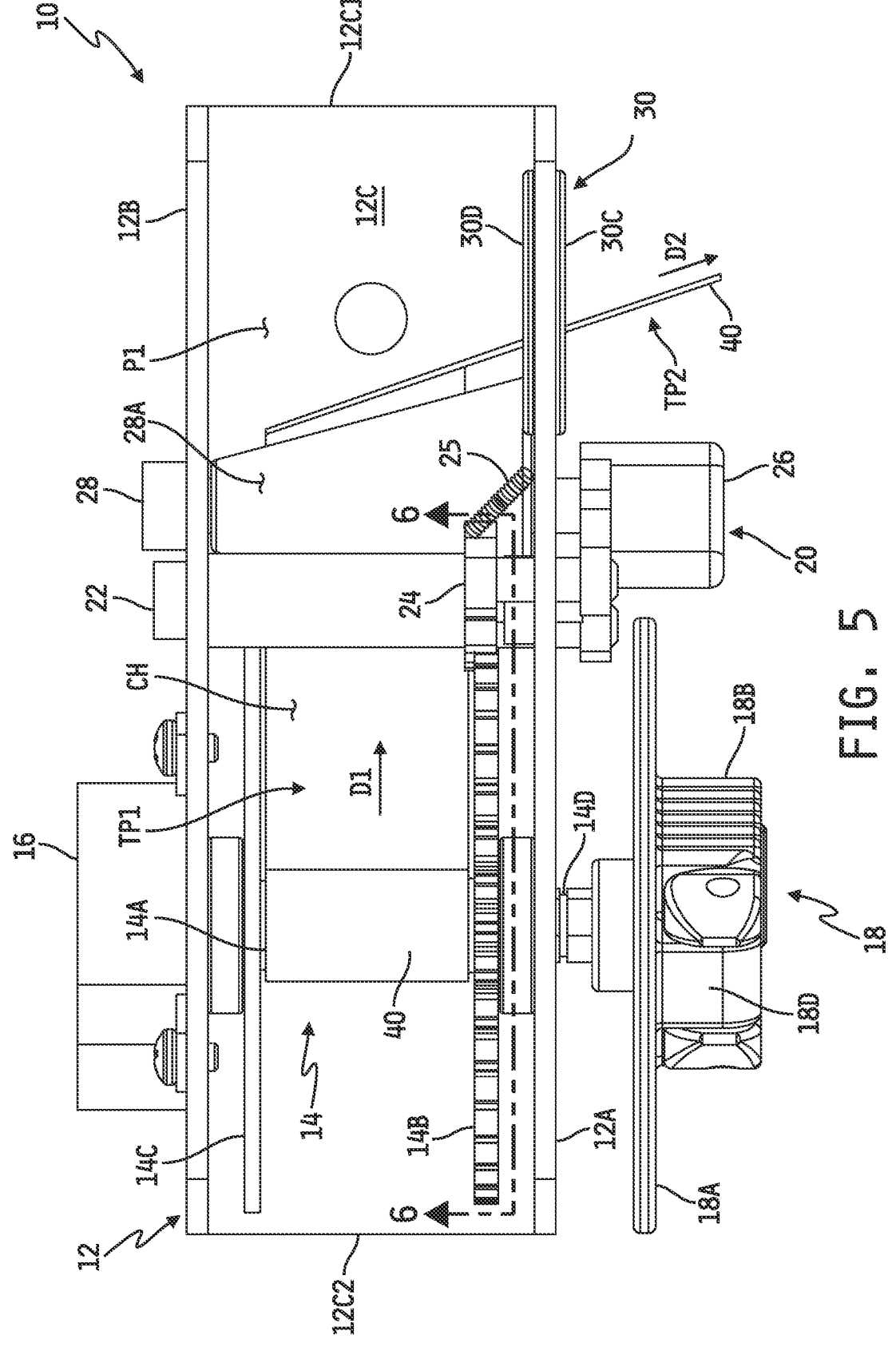
FIG. 5 is a top plan view of the web retractor of FIGS. 1-4 shown with the cover and face plate removed and with the restraint web operatively coupled thereto.

The spool 14 illustratively includes a spindle 14A having a toothed wheel 14B mounted to one end thereof and a non-toothed wheel 14C mounted to an opposite end thereof. In alternate embodiments, the wheel 14B may be non-toothed and the wheel 14C may be toothed, or both wheels 14B, 14C may be toothed. In any case, a spool shaft 14D is rigidly mounted to the spindle 14A such that the spindle 14A, the toothed wheel 14B and the non-toothed wheel 14C together rotate with the shaft 14D. Opposite ends of the spool shaft 14D illustratively extend through the respective side walls 12A, 12B of the frame 12 such that the spool shaft 14D, and thus the spindle 14A and wheels 14B, 14C, rotates about the spool axis A relative to the side walls 12A, 12B. The spindle 14A and shaft 14D each define a longitudinally extending slot 14E therethrough sized to receive one end of a flexible or semi-flexible web 40 therethrough (see, e.g., FIGS. 4 and 5). This end of the web 40 is illustratively secured to the spindle 14A and/or to the shaft 14D in a conventional manner, and the web is illustratively wound around the spindle 14A as illustrated by example in FIGS. 4 and 5. As best seen in FIGS. 4 and 5, the web 40 is illustratively paid from the spool 14 along a direction of travel D1 from the spindle 14A toward the end 12C1 of the bottom wall 12C of the frame 12, such that the web travels from the spool 14 along a travel path TP1 that is generally normal to the spool axis A which is generally normal to planes formed by the inwardly-facing surfaces of the side-walls 12A, 12B.

A conventional power spring assembly 16, e.g., a conventional power spring contained within a housing or cover, is operatively coupled to an outer surface of the sidewall 12B of the frame 12, and one end of the spindle 14D extends through the side wall 12B and operatively engages the power spring contained in the power spring assembly 16 in a conventional manner. The power spring contained in the power spring assembly 16 is configured in a conventional manner to apply a rotational biasing force to the spool 14 in a web take up direction, i.e., in a direction which takes up the web 40 onto the spool 14, which rotational biasing force may be manually overcome when the retractor 10 is not locked (as will be described below) by rotating the spool 14, e.g., via movement of the web 40, in the opposite, web payout, direction to draw the web 40 from the spool 14 and out of the web retractor 10. A free end of the web 40 will generally extend from the retractor 10, as will be described in detail below, and an engagement member, e.g., a hook, tongue assembly, buckle assembly or other conventional engagement member, may be attached to the free end of the web 40.

A ratchet handle assembly 18 is operatively mounted to the end of the spool shaft 14D opposite that to which the power spring of the power spring assembly 16 is operatively engaged. In the illustrated embodiment, the end of the shaft 14D extends outwardly away from an outer surface of the side wall 12A of the frame 12, and the ratchet handle assembly 18 is illustratively mounted to the shaft 14D. In the illustrated embodiment, the handle assembly 18 is mounted so as to be offset from outer surface of the side wall 12A of the frame 12, as best illustrated in FIG. 5, to accommodate mounting of a cover, faceplate or other housing component thereto as illustrated by example in FIG. 1. In some embodiments, such a cover, faceplate or other housing component may be omitted, and in such embodiments the handle assembly 18 may be mounted so as to be flush is, in contact with or adjacent to the outer surface of the side wall 12A of the frame 12.

In the illustrated embodiment, the handle assembly 18 includes a disk-shaped body 18A and an elongated handle grip 18B at least partially extending across an outer diameter of the body 18A. In some embodiments, as illustrated by example in FIGS. 1, 2 and 4-5, ribs may be defined along opposite sides of the handle grip 18B to facilitate gripping of the handle grip 18B by a human hand. In some embodiments, a crank handle 18C is mounted to the handle grip 18B, e.g., at a pivot connection 18D. The crank handle 18C is illustratively pivotable between a stored position, e.g., as illustrated in FIGS. 1-5 and 7A, and a use position, e.g., as illustrated in FIG. 7B. In the stored position of the crank handle 18C, manual rotation of the spool 14 may be accomplished via rotational manipulation of the handle grip 18B, and in the use position of the crank handle 18C, manual rotation of the spool 14 may be accomplished via either or both of the handle grip 18B and the crank handle 18C. It will be understood that the disk-shaped handle assembly 18 illustrated by example in FIGS. 1-5 is provided only by way of example, and that in alternate embodiments the handle assembly 18 may take other conventional forms and/or shapes.

A mode switch assembly 20 is operatively mounted to the side wall 12A of the frame 12. The mode switch assembly 20 illustratively includes an elongated shaft 22 mounted to and between the side walls 12A, 12B of the frame 12 near the top ends thereof, and is spaced apart longitudinally along the frame 12 from the spool 14 such that the central, longitudinal axis B of the shaft 22 is positioned between the central, longitudinal axis A of the spool shaft 14D and the end 12C1 of the bottom wall 12C of the frame 12. In some embodiments, the shaft 22 is fixed in position relative to the side walls 12A, 12B, although in alternate embodiments the shaft 22 may be fully rotatable relative to the side walls 12A, 12B or partially rotatable relative to the side walls 12A, 12B, e.g., rotatable between two or more limits. In any case, a drag and locking pawl 24 is rotatably mounted to the shaft 22 in the channel CH between the side walls 12A, 12B and adjacent to the toothed wheel 14B.

Figure 6:
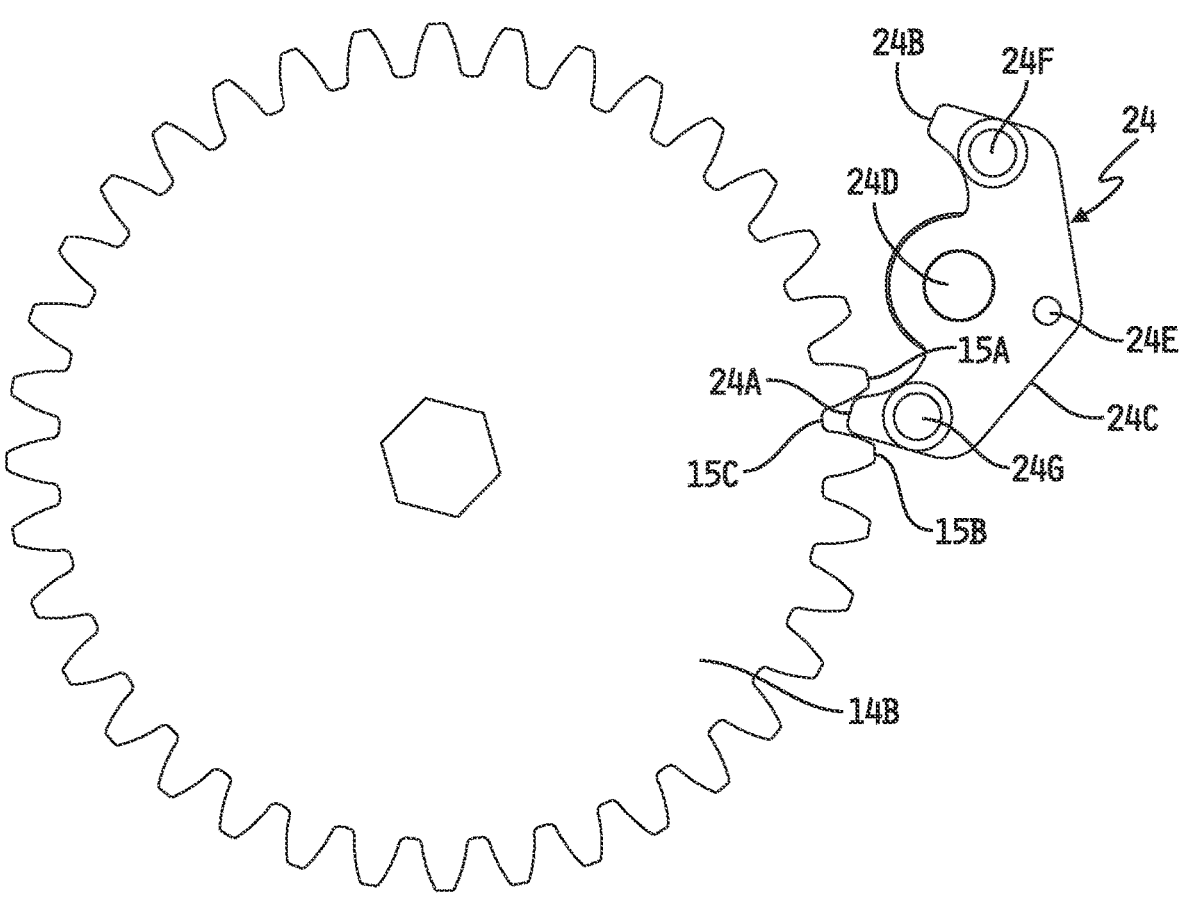
FIG. 6 is a simplified cross-sectional view of the web retractor of FIG. 5 as viewed along section lines 6-6 thereof.

Referring to FIG. 6, for example, the drag and locking pawl 24 illustratively defines legs 24A, 24B at opposite ends of a body 24C, and the body 24C illustratively defines an opening 24D positioned approximately midway between the legs 24A, 24B along one side of the body 24, which opening 24D is sized to receive the shaft 22 therethrough. The body 24C of the pawl 24 is rotatably mounted to the shaft 22 via the opening 24D with the ends of the legs 24A, 24B generally facing the toothed wheel 14B such that the pawl 24 is rotatable relative to the shaft 22. The body 24C further illustratively defines another opening 24E along an opposite side of the body 24C and generally aligned with the opening 24D. One end of a biasing member 25, e.g., spring clip, is coupled to the pawl 24 via the opening 24E, and an opposite end is coupled to the side wall 12A of the frame via an opening 12M (see, e.g., FIGS. 3, 7A and 8A). The purpose of the biasing member 25 is to urge the mode switch 26 into at least one of its operating positions as will be described in detail below and/or to maintain the locking pawl 24 and the mode switch 26 in the selected position.

A pin 24F extends transversely away from the body 24C of the pawl 24 adjacent to or near a free end of the leg 24B (i.e., extends transversely away from the body 24C relative to the tooth 24B), and another pin 24G extends transversely away from the body 24C of the pawl 24 adjacent to or near a free end of the leg 24A (i.e., extends transversely away from the body 24C relative to the leg 24A). In the illustrated embodiment, the body 24C and the pins 24F, 24G are together of uniform construction, although in alternate embodiments either or both of the pins 24F, 24G may be separate component(s) joined to the body 24C. In any case, the pins 24F, 24G extend through respective arcuate slots 121, 12J defined through the side wall 12A of the frame 12, and are coupled to a mode switch 26 spaced apart from the outer surface of the side wall 12A of the frame 12 (see, e.g., FIGS. 7A, 8A and 11A-11B).

Figure 11A:
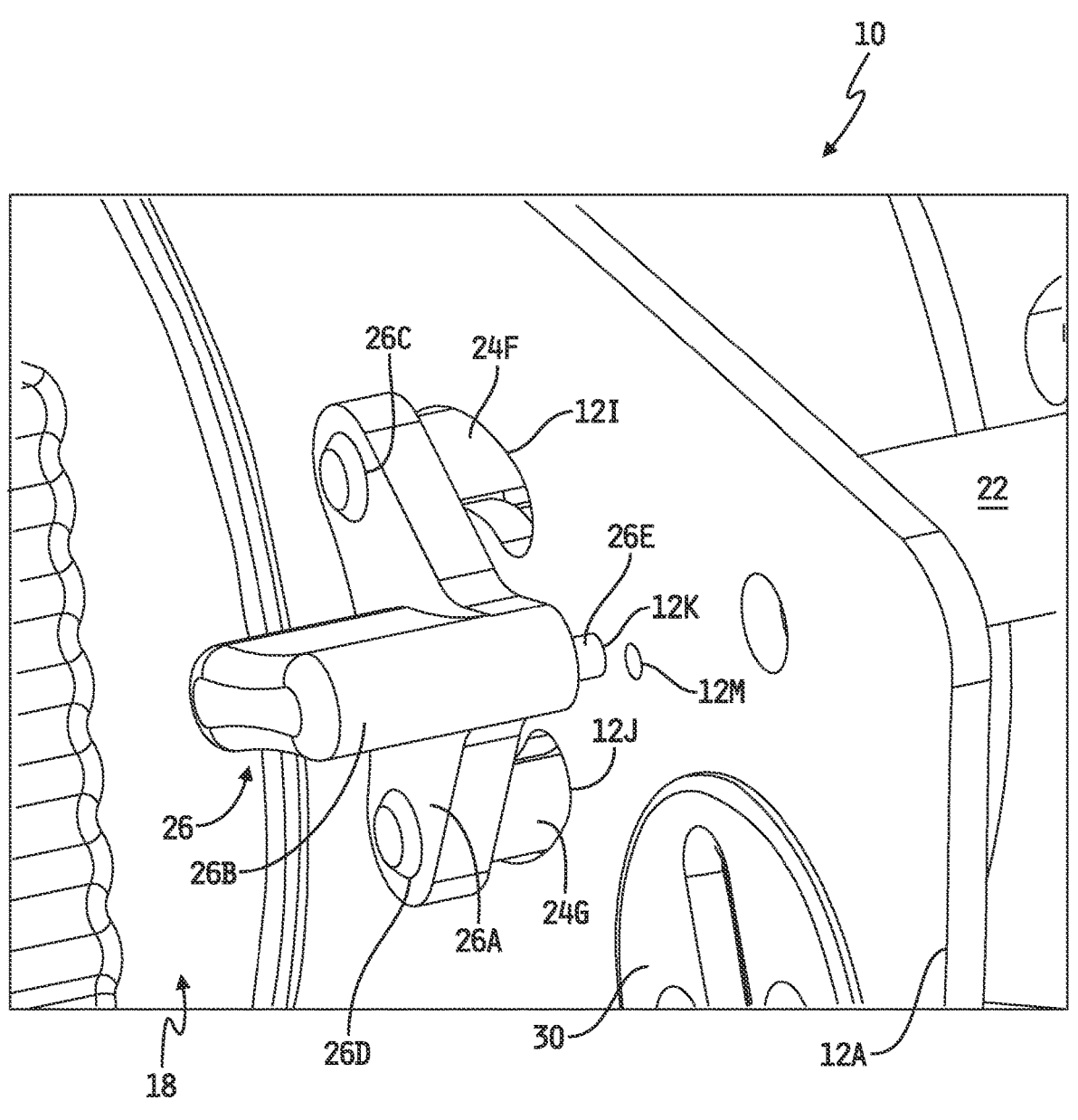
FIG. 11A is a magnified view of the web retractor of FIG. 9 showing a biased projection of the mode selection switch received within a detent opening of the side wall of the retractor frame in the free spooling position of the mode selection switch.
Figure 11B:
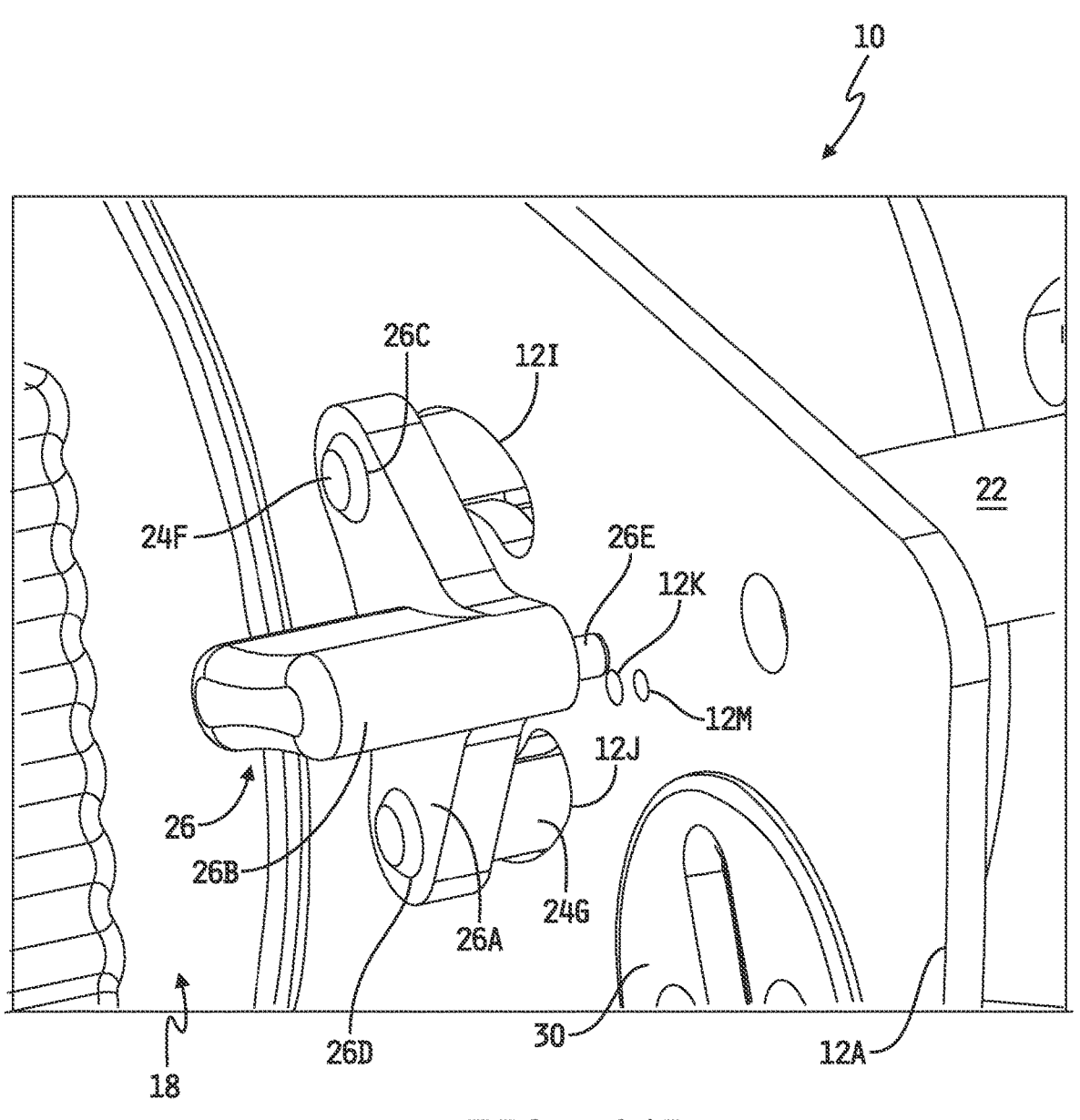
FIG. 11B is a magnified view similar to FIG. 11A showing the mode selection switch drawn slightly away from the free spooling position.

Referring to FIGS. 11A and 11B in particular, the mode switch 26 illustratively defines a wing-shaped body 26A having a switch handle or grip 26B extending transversely away from a front surface thereof approximately mid-way between the free ends of the wings. An opening 26C is defined through the body 26A adjacent to the free end of one of the wings, and another opening 26D is defined through the body 26A adjacent to the free end of the other wing. The openings 26C, 26D are illustratively sized to receive the pins 24F, 24G respectively of the drag and locking pawl 24 therein to secure the drag and locking pawl 24 to the mode switch 26. The mode switch 26 and the drag and locking pawl 24 are thus together movable, e.g., rotatable, relative to the arcuate slots 121, 12J defined through the side wall 12A between multiple different positions, and the drag and locking pawl 24 is configured such that each leg 24A, 24B engages the toothed wheel 14B in a different one of at least two of the multiple positions of the mode switch 26, as will be described in detail below. The mode switch 26 further illustratively defines a protrusion 26E which extends away from the back surface of the body 26 approximately centrally between the wings and opposite the handle 26B. The side wall 12A of the frame 12 illustratively defines a detent socket 12K which extends at least partially into the outer surface of the side wall 12A and is sized to receive the protrusion 26E therein in one of the multiple positions of the mode switch 26, as will be described below. The mode switch 26 is illustratively biased toward the side wall 12A of the frame 12 by the biasing member 25 described above so that the protrusion 26E is drawn into the detent socket 12K when aligned therewith. Alternatively or additionally, the biasing member 25 operates to bias the locking pawl 24 relative to the frame 12 so as to maintain the locking pawl 24 and the mode switch 26 in the selected position.

Referring again to FIGS. 1-5 in particular, an elongated web deflector 28 is mounted to and between the side walls 12A, 12B of the frame 12 adjacent to or otherwise near the bottom wall 12C, and is spaced apart longitudinally along the frame 12 from the spool 14. In alternate embodiments, the web deflector 28 may be mounted to only one of the side walls 12A, 12B and/or to the bottom wall 12C. In the illustrated embodiment, the central, longitudinal axis C of the web deflector 28 is positioned, relative to the side walls 12A, 12B and the bottom wall 12C, between the central, longitudinal axis B of the shaft 22 and the end 12C1 of the bottom wall 12C of the frame 12, i.e., such that the central, longitudinal axis B of the shaft 22 is positioned between the central, longitudinal axes of the spool shaft 14D and the web deflector 28. In other embodiments, the shaft 22 may be otherwise positioned between the side walls 12A, 12B of the frame 12 such that the longitudinal axis B of the shaft 22 is not, in such embodiments, positioned between the central, longitudinal axes of the spool shaft 14D and the web deflector 28. In some embodiments, the shaft 28 is fixed in position relative to the side walls 12A, 12B, although in alternate embodiments the shaft 22 may be fully rotatable relative to the side walls 12A, 12B or partially rotatable relative to the side walls 12A, 12B, e.g., rotatable between two or more limits. In any case, the web deflector 28 is illustratively configured to deflect the web 40 traveling in the direction D1 and along a travel path TP1 to a different direction to feed the web 40 along a different travel path that is not parallel with the travel path TP1, as will be described in greater detail below.

In the illustrated embodiment, the web deflector 28 is positioned relative to the side walls 12A, 12B and/or bottom wall 12C of the frame 12 such that the travel path TP1 of the web 40 is parallel with a plane P1 defined by the inner surface of the bottom wall 12C and passes through a space defined between the web deflector 28 and the inner surface of the bottom wall 12C of the frame 12. In some alternate embodiments, the web deflector 28 may be positioned relative to the side walls 12A, 12B and/or bottom wall 12C of the frame 12 such that the travel path TP1 forms an angle with the plane P1. In some such alternate embodiments, the position of the web deflector 28 relative to the side walls 12A, 12B and/or bottom wall 12C of the frame 12 may require the web 40 to pass through a space defined between the web deflector 28 and the inner surface of the bottom wall 12C of the frame 12, and in other such alternate embodiments the position of the web deflector 28 relative to the side walls 12A, 12B and/or bottom wall 12C of the frame 12 may require the web to pass over the web deflector 18, i.e., between the web deflector 28 and the open top of the frame 12. In some embodiments, the web deflector 28 is configured to guide the web 40 from the spool 14 out of the web retractor 10 through the side wall 12A, e.g., via an opening 12G (see, e.g., FIGS. 8A and 8B), and to guide the web 40 into the web retractor 10 to the spool 14, e.g., also through the opening 12G. In alternate embodiments, the web deflector 28 may be configured to guide the web 40 from the spool 14 out of the web retractor through the side wall 12B, e.g., via an opening 12H (see, e.g., FIG. 3), through the bottom wall 12C, e.g., via an opening 12L (see., e.g., FIG. 18), through the open top of the frame 12, e.g., via an opening 36A through the housing 36 or via the open top of the frame 12 in embodiments that do not include the housing 36, and to guide the web 40 of the web retractor 10 to the spool 14, also via the respective opening or open top of the frame 12. In any case, the web deflector 28 is illustratively spaced apart from the spool 14 such that the web deflector 28 guides the web 40 to and from the spool 14 longitudinally along the channel CH between the web deflector 28 and the spool 14, e.g., along a plane normal to the spool axis A (parallel or non-parallel with the plane P1).

In the illustrated embodiment, an automatically adjusting web guide 30 is mounted to the side wall 12A of the frame 12, approximately centrally between the bottom wall 12C and the top of the side wall 12A, and includes a linear web slot 32 sized to receive the web 40 therethrough. In some alternate embodiments, the web slot 32 may be non-linear, piecewise linear or a combination of linear, piecewise linear and/or non-linear, and/or offset from the bottom wall 12C or the top of the side wall 12A. In any case, as best illustrated in FIGS. 4 and 5, the web guide 30 receives the web 40 from the web deflector 28 and guides the web 40 along a direction D2 and along a corresponding travel path TP2, wherein the direction D2 is generally perpendicular to the direction D1 and the travel path TP2 is likewise generally perpendicular to the travel path TP1. In this regard, and in the embodiment illustrated in FIGS. 1-14, the web engaging surface 28A of the web deflector 28, i.e., at least a portion of the outer surface of the web deflector 28, is illustratively frustoconical in shape with the larger diameter of the frustocone adjacent to the inner surface of the side wall 12A and with the smaller diameter of the frustocone adjacent to the inner surface of the side wall 12B, so as to deflect and direct or guide the web 40 toward and through the slot 32 of the web guide 30 mounted to the side wall 12A.

In some embodiments, the web deflector 28 is rotatable relative to the side walls 12A, 12B to facilitate deflecting and directing of the web 40 toward and through the web guide 30. Alternatively or additionally, the frustoconical surface of the web deflector 28 may be configured, e.g., via application of one or more coatings or films thereto and/or via suitable selection of one or more materials from which the web deflector 28 is formed, to present a low friction surface to the web 40 to facilitate movement of the web 40 relative to the web deflector 28. In some alternate embodiments, the side wall 12A may be configured, the web deflector 28 may be configured, the web guide 30 may be configured and/or the web guide 30 may be mounted to another structure, such that the direction D1 is not perpendicular to the direction D2 so that the travel path TP2 forms an acute or obtuse angle relative to the travel path TP1.

The side wall 12A of the frame 12 illustratively defines an opening 12G therethrough (see, e.g., FIGS. 8A and 8B) within which the web guide 30 is received. In some embodiments, the side wall 12B of the frame 12 may alternatively or additionally define an opening 12H therethrough (see, e.g., FIG. 10), and the web guide 30 may be operatively mounted to the side wall 12B in the opening 12H to guide the web 40 along a direction D3 and along a corresponding travel path TP3 that is generally parallel with a plane P3 defined by the outer surface of the side wall 12B of the frame 12 as illustrated by example in FIG. 10, wherein the direction D3 is generally opposite D2 and is perpendicular to the direction D1, and the travel path TP3 is likewise generally opposite TP2 and perpendicular to the travel path TP1. In such embodiments, the position of the web deflector 28 will be reversed such that the larger diameter of the frustocone is adjacent to the inner surface of the side wall 12B and the smaller diameter of the frustocone is adjacent to the inner surface of the side wall 12A so as to guide the web 40 through the web guide 30 mounted to the side wall 12B in the opening 12H.

Figure 7A:
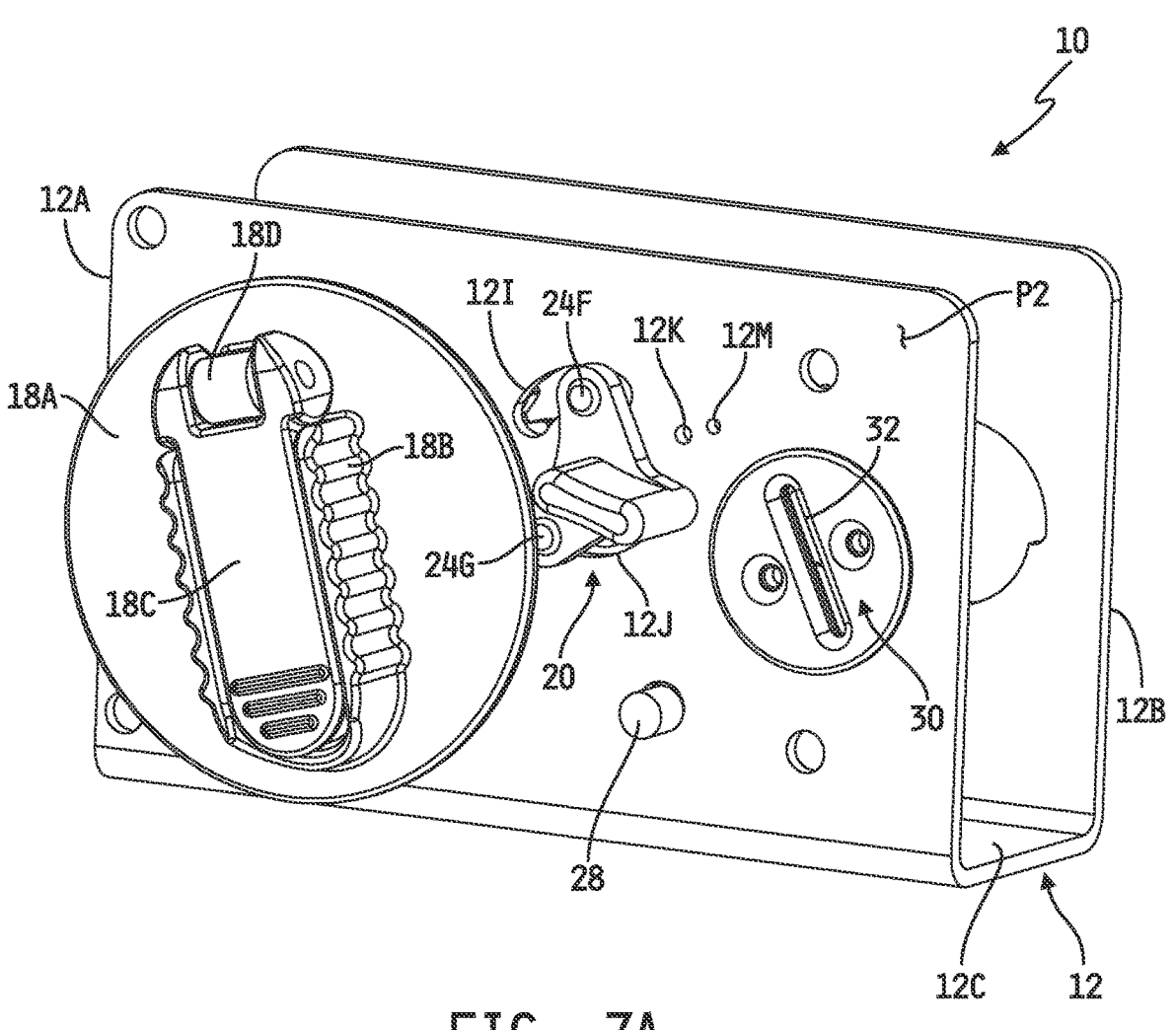
FIG. 7A is a font perspective view similar to FIG. 1 shown with the cover and face plate removed and with one of the web guides in one position relative to a respective side wall of the web retractor frame.
Figure 7B:
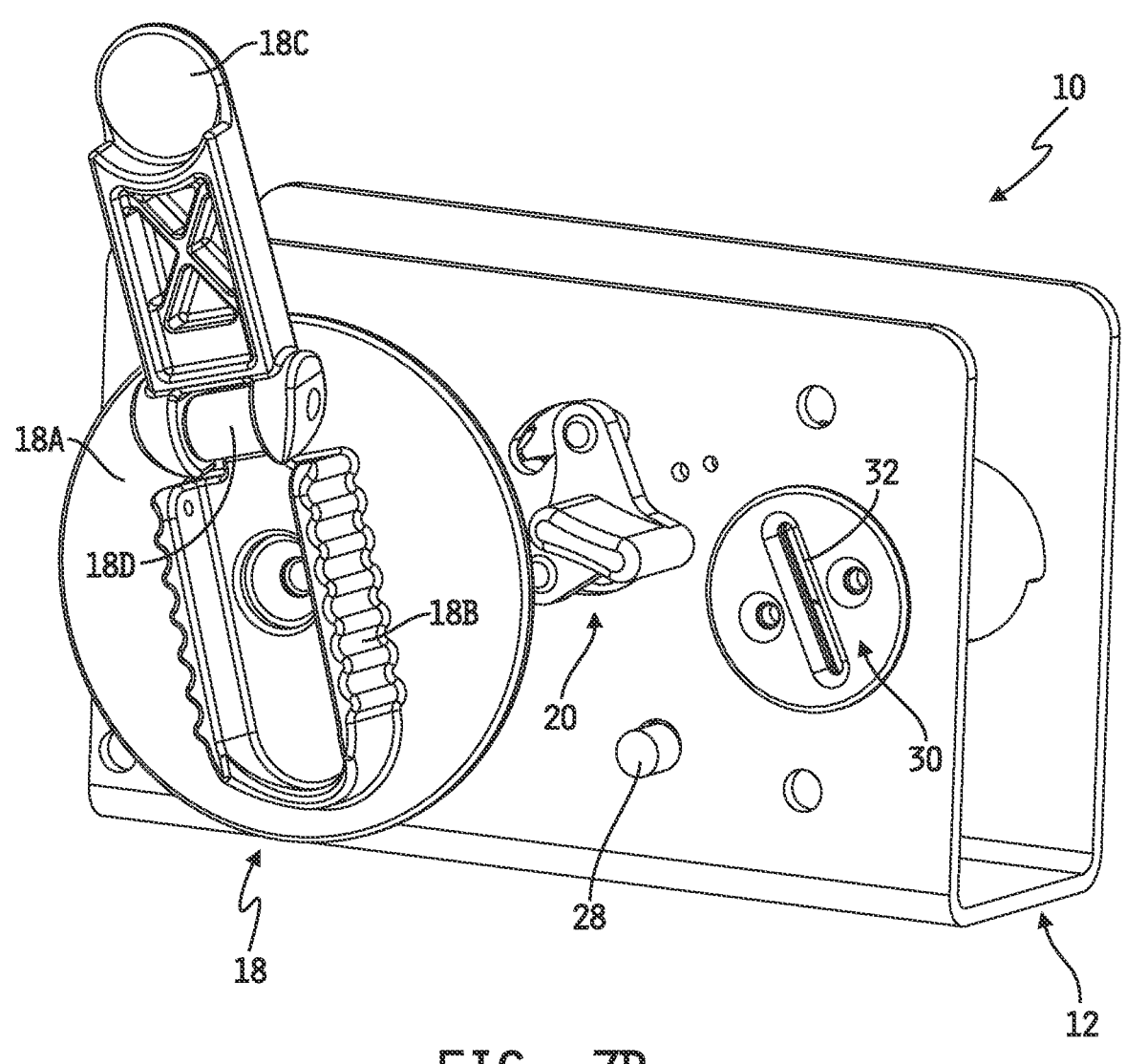
FIG. 7B is a front perspective view similar to FIG. 7A shown with the web guide in another position relative to the respective side wall of the retractor frame.
Figure 8A:
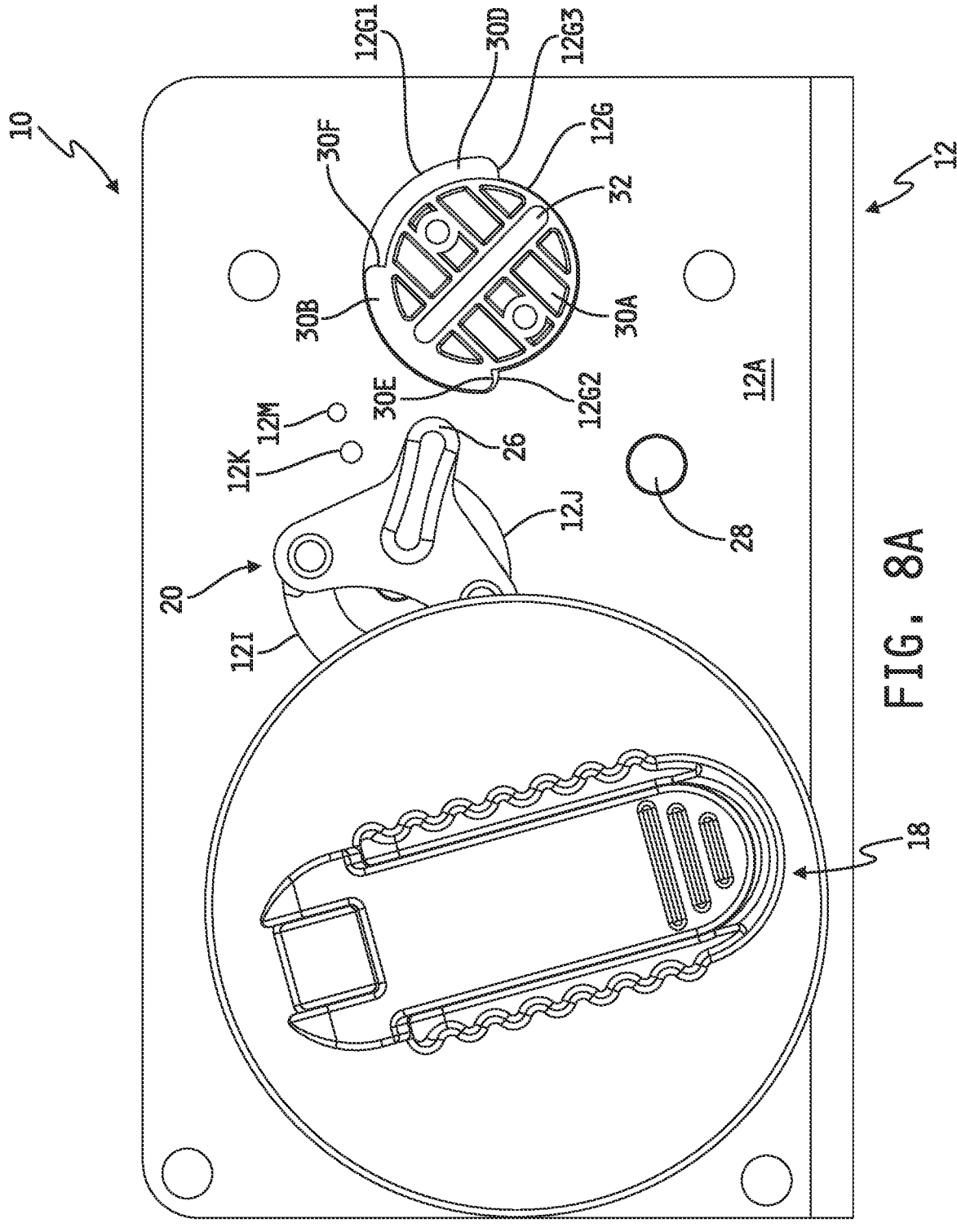
FIG. 8A is a front plan view of the web retractor of FIGS. 1-7B shown with the cover, face plate and a front plate of the web guide of FIGS. 7A and 7B removed, and with the web guide in one extreme position thereof relative to the respective side wall of the retractor frame.
Figure 8B:
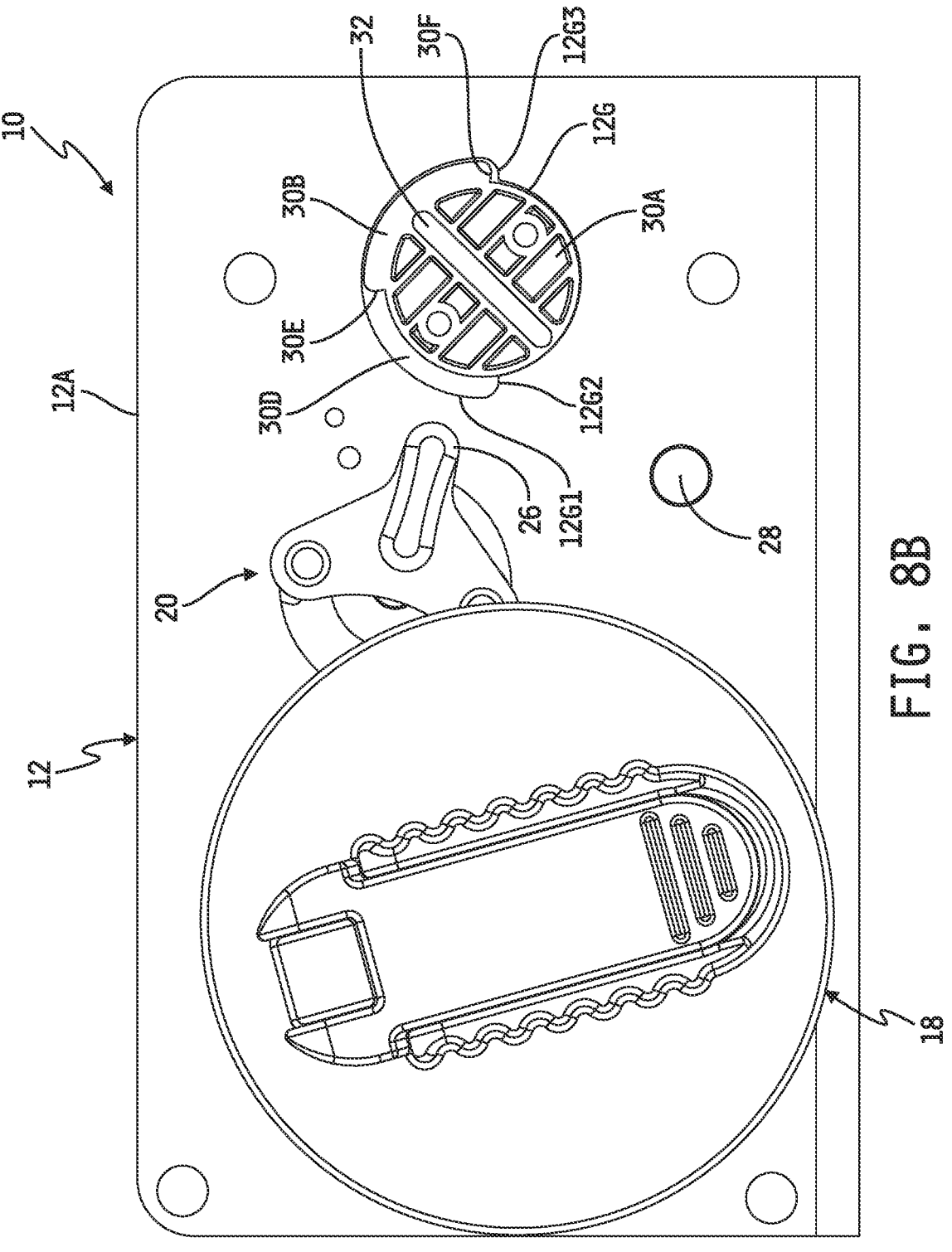
FIG. 8B is a front plan view similar to FIG. 8A shown with the web guide in another extreme position thereof relative to the side wall of the retractor frame.

In any case, the web guide 30 is in the illustrated embodiment is rotatable within the opening 12G (or 12H) and relative to the side wall 12A (or 12B), e.g., as illustrated by example in FIGS. 7A and 7B, such that the orientation of the slot 32 relative to the side wall 12A or 12B is automatically adjustable depending upon the direction of travel of the web 40 exiting the retractor 10 (e.g., the slot 32 is substantially vertical in FIG. 7A and is approximately −30 degrees relative to vertical in FIG. 7B). Referring now to FIGS. 5, 8A and 8B, the web guide 30 illustratively includes a rotatable, generally disk-shaped body 30A received within the opening 12G defined through the side wall 12A of the frame 12, and opposed face caps 30C, 30D secured to respective opposite faces of the body 30A so as to retain the web guide 30 within the opening 12G and mounted to the side wall 12A of the frame 12. Each of the body 30A and face caps 30C, 30D define a slot therethrough which slots are aligned with one another to define the slot 32 of the web guide 30 through which the web 40 extends when the face caps 30C, 30D are affixed to the body 30A, e.g., via any number of conventional fixation members, adhesive and/or one or more conventional bonding media. The face caps 30C, 30D illustratively have diameters at least slightly larger than that of the opening 12G so as to secure the web guide 30 to the side wall 12A of the frame 12 while also allowing for at least some amount of rotation of the web guide 30 within the opening 12G and relative to the side wall 12A.

Referring specifically to FIGS. 8A and 8B, the opening 12G defined through the side wall 12A of the frame 12 is illustratively circular which transitions along an edge thereof to an arcuate opening 12G1 having a larger diameter than that of the opening 12G such that the arcuate opening 12G1 forms an arc-shaped slot over a portion of the opening 12G and with the arcuate opening or slot 12G1 terminating at opposite terminal ends 12G2 and 12G3 respectively against respective portions of the outer periphery of the opening 12G. In the illustrated embodiment, the arc defined by the opening 12G1 spans approximately 180 degrees between the terminal ends 12G2, 12G3, although in alternate embodiments the arc defined by the opening 12G1 may span greater or less than 180 degrees. Also in the illustrated embodiment, a plane defined by and between the terminal ends 12G2, 12G3 of the opening 12G1 is approximately parallel with the plane P1 defined by the top surface of the bottom wall 12C of the frame 12, although in alternate embodiments the plane defined by and between the terminal ends 12G2, 12G3 may be non-parallel with the plane P1.

The disk-shaped body 30A is likewise illustratively circular and transitions along an outer edge thereof to an arcuate protrusion 30B having a larger diameter such that the arcuate protrusion 30B forms an arc-shaped protrusion over a portion of the body 30A with the protrusion 30B terminating at opposite terminal ends 30E and 30F respectively against respective portions of the outer periphery of the body 30A. In the illustrated embodiment, the arc defined by the protrusion 30B spans approximately 90 degrees between the terminal ends 30E, 30F, although in alternate embodiments the arc defined by the protrusion 30B may span greater or less than 90 degrees. In the illustrated embodiment, the protrusion 30B is rotatable approximately 90 degrees within the slot 12G1. The slot 32 is illustratively positioned relative to the body 30A with one terminal end thereof approximately mid-way between the terminal ends 30E, 30F such that the slot 32 is thus rotatable between approximately 45 degrees counterclockwise relative to vertical, as illustrated by example in FIG. 8A wherein the counterclockwise rotation of the body 30A is limited by contact between the terminal end 30E of the protrusion 30B and the terminal end 12G2 of the opening 12G1, and approximately 45 degrees clockwise relative to vertical, as illustrated by example in FIG. 8B wherein the clockwise rotation of the body 30A is limited by contact between the terminal end 30F of the protrusion 30B and the terminal end 12G3 of the opening 12G1. In alternate embodiments, the opening 12G1 and the protrusion 30B may each be suitably sized to allow for any degree of rotation of the web guide 30 relative to the side wall 12A of the frame 12, and/or the slot 32 may be alternatively positioned relative to the body 30A so as to be rotatable between any opposite angular positions relative to vertical or other reference position or angle. Rotation of the web guide 30 is thus limited to an arc defined between the two stops 12G2, 12G3 on either side of the opening 12G, although in alternate embodiments rotation of the web guide 30 may not be limited at all (e.g., the opening 12G1 and the protrusion 30B may be omitted altogether so that the web guide 30 may freely rotate within the opening 12G without restriction), or the web guide 30 may instead be fixed in position such that the orientation of the slot 32 is likewise fixed.

In some embodiments, the web retractor 10 may be provided with a suitable cover and/or housing for the purpose of protecting one or more of the components of the retractor 10 and/or for the purpose of providing a finished look for the presentation of at least one surface of the retractor 10. In the illustrated embodiment, for example, a face plate 34 is provided over the outer surface of the side wall 12A, and a housing 36 is provided over the remainder of the frame 12, as best seen in FIG. 1. Referring to FIG. 1, the face plate 34 illustratively defines an opening 34A therethrough sized and configured to receive the disk-shaped body 18A of the handle assembly 18 therethrough. In the illustrated embodiment, the face plate 34 is configured such that the outer surface of the body 18A is slightly recessed within the opening 34A relative to an outer surface 34D of the face plate 34, although in other embodiments the face plate 34 may be configured such that the outer surface of the body 18A adjacent to the opening 34A is flush with or extends outwardly beyond the outer surface 34D of the face plate 34. The face plate 34 further illustratively defines an opening 34B therethrough sized and configured to receive the mode switch 26 of the mode switch assembly 20 therethrough. In the illustrated embodiment, the face plate 34 is configured such that only a handle 26B of the mode switch 26 extends outwardly from the opening 34B (see, e.g., FIGS. 11A and 11B), although in other embodiments the face plate 34 may be configured such that at least a portion of the switch body 26A is flush with or extends beyond the outer surface 34D of the face plate 34 adjacent to the opening 34B. The face plate 34 further illustratively defines an opening 34C therethrough sized and configured to receive the web guide 30 therethrough. In the illustrated embodiment, the face plate 34 is configured such that the outer surface of the web guide 30 is recessed within the opening 34C relative to an outer surface 34D of the face plate 34, although in other embodiments the face plate 34 may be configured such that the outer surface of the web guide 30 adjacent to the opening 34C is flush with or extends beyond the outer surface 34D of the face plate 34.

The web retractor 10 is selectively operable in any of multiple different modes depending upon the position of the mode switch 26 relative to the housing 12. In the illustrated embodiment, for example, the web retractor 10 is selectively operable in any of three different modes depending upon the position of the mode switch 26 relative to the housing 12; a ratchet mode, a free spooling mode and a drag mode.

In the ratchet mode, as described above in the background section, the pawl 24 engages the toothed wheel 14B of the spool 14 in a manner which prevents rotation of the spool 14 in a web payout direction, i.e., the so-called locked state in which the length of the web 40 extending from the spool 14 cannot be increased, but which allows for ratcheting rotation of the spool 14, once locked, in a web take up direction to thereby incrementally shorten the length of the web 40 between the spool 14 and the paid out end of the web 40. The ratchet mode of operation is illustrated by example in FIGS. 1-8B, wherein the mode switch 26 is manually moved to the ratchet position as best shown in FIG. 1, e.g., by manually rotating the mode switch handle 26B to its most clockwise position.

Figure 3:
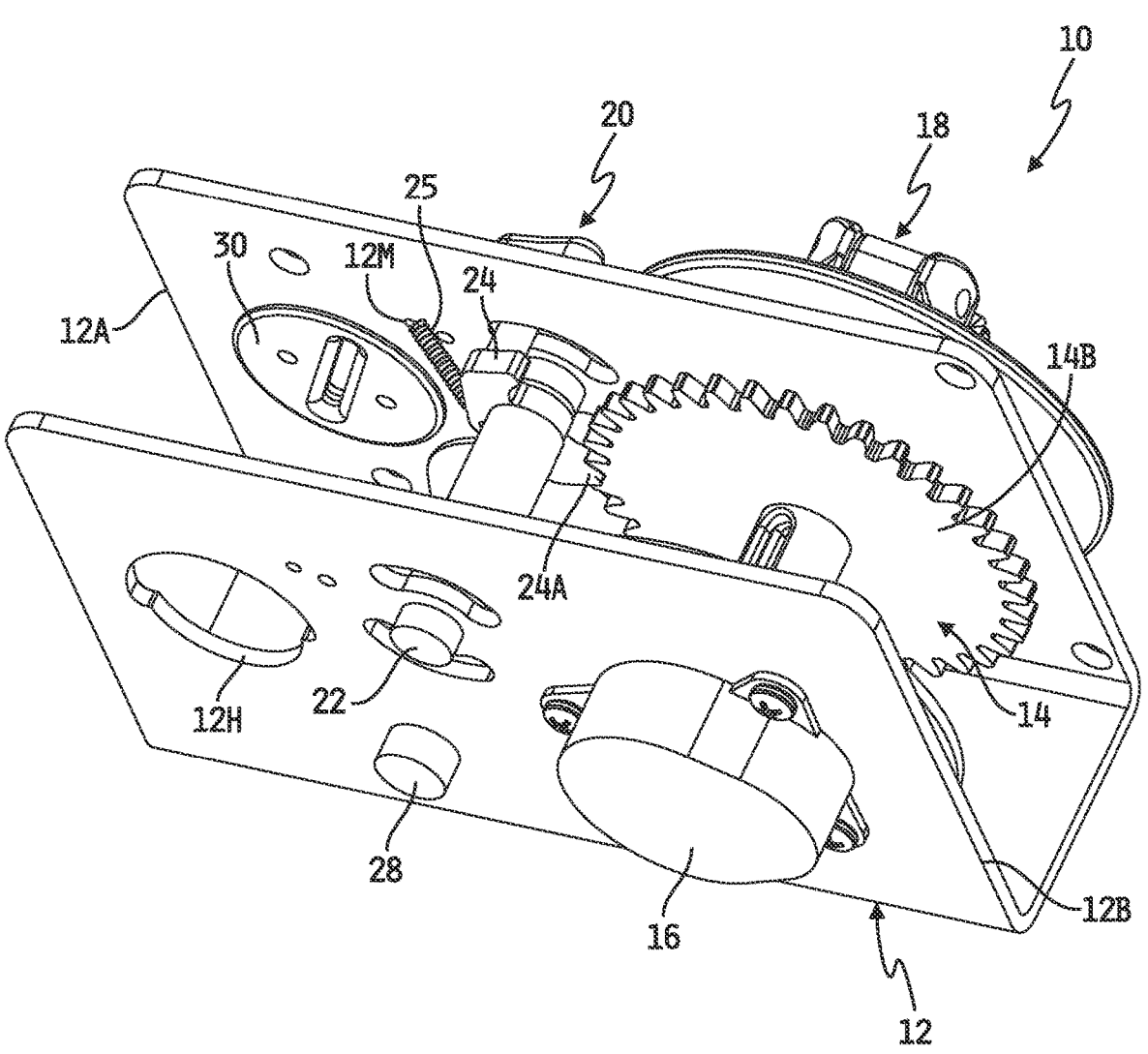
FIG. 3 is another rear perspective view of the web retractor of FIGS. 1 and 2.

As the mode switch 26 is rotated to the ratchet position, the pins 24F and 24G of the pawl 24 travel along the respective channels 121, 12J defined through the side wall 12A of the frame (e.g., see FIGS. 7A-8B), which forces the free end of the leg 24A of the pawl 24 against the toothed wheel 14B of the spool 14, as illustrated in FIG. 3, and into a channel 15C defined between two adjacent teeth 15A, 15B of the toothed wheel 14B as illustrated in FIG. 6. In this position of the pawl 24, the leg 24A positioned in the channel 15C defined between the two adjacent teeth 15A, 15B of the toothed wheel 14B locks the retractor 10 by preventing rotation of the spool 14 in the web payout direction (i.e., counterclockwise in FIG. 6). Also in this position of the pawl 24, the handle assembly 18 may be rotated in the web take up direction (i.e., clockwise in FIG. 6) to take up web 40 onto the spool 14. The pawl 24 is positioned relative to the shaft 22, the leg 24A of the pawl 24 is positioned relative to the wheel 14B and the pawl 24 is shaped (see, e.g., FIG. 6) all so as to maintained the leg 24A of the pawl 24 within the channel 15C defined between the two adjacent teeth 15A, 15B of the wheel 14B to block or prevent rotation of the wheel 14B in the web payout direction (i.e., counterclockwise in FIG. 6), but to ride over the teeth of the wheel 14B in the clockwise direction of the wheel 14B (see FIG. 6) as the handle assembly 18B manually rotates the wheel 14B in the web take up direction (i.e., clockwise in FIG. 6). Such rotation of the wheel 14B by the handle 18B in the web take up position (clockwise in FIG. 6) forces the leg 24A away from the channel 15C which causes the pawl 24 to rotate or pivot about the shaft 22 in the counterclockwise direction (see FIG. 6) as the leg 24A is forced away from the channel 15C. In embodiments which include it, the crank handle 18C may be deployed as illustrated in FIG. 7B to facilitate manual rotation of the handle assembly 18 in the counterclockwise or web take up direction.

Figure 9:
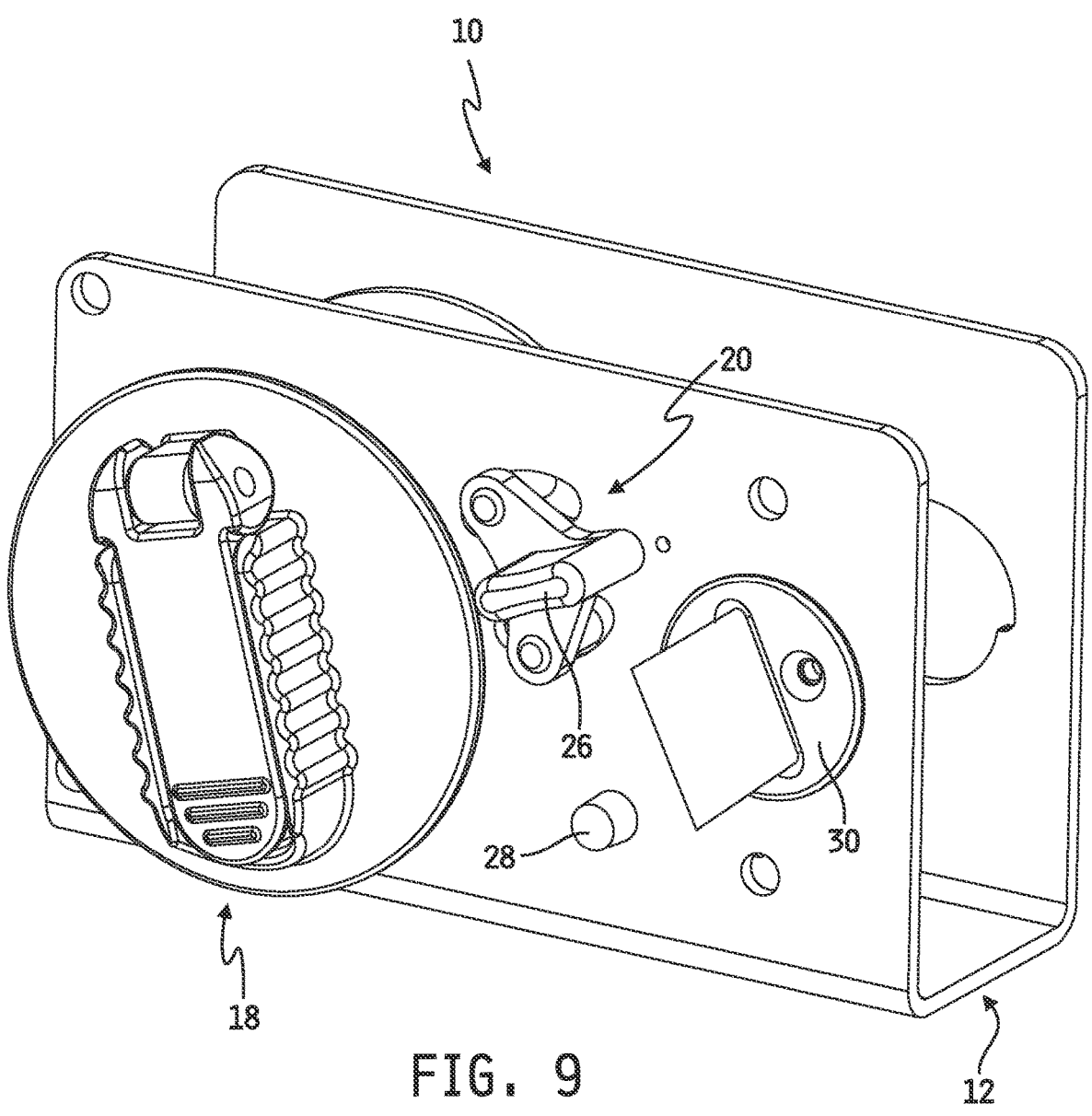
FIG. 9 is a front perspective view similar to FIGS. 7A and 7B and showing the web retractor with the mode selection switch in a free spooling position.

In the free spooling mode of the web retractor 10, the pawl 24 is disengaged from the toothed wheel 14B of the spool 14 so that the spool 14 may freely rotate in the web take up direction, i.e., under rotational bias of the power spring in the power spring assembly 16 that is operatively coupled to the spool 14, or in the web pay out direction, i.e., by manually drawing the web 40 out of the web retractor 10 with a force that imparts a rotational force on the spool 14 in the web pay out direction that is greater than the bias of the power spring acting against the spool 14 in the web take up direction. The free spooling mode of operation is illustrated by example in FIGS. 9-11B, wherein the mode switch 26 is manually moved to the free position as best shown in FIGS. 1 and 9, e.g., by manually rotating the mode switch handle 26B counterclockwise from the ratchet position, or clockwise from the drag position, to the free position.

Figure 10:
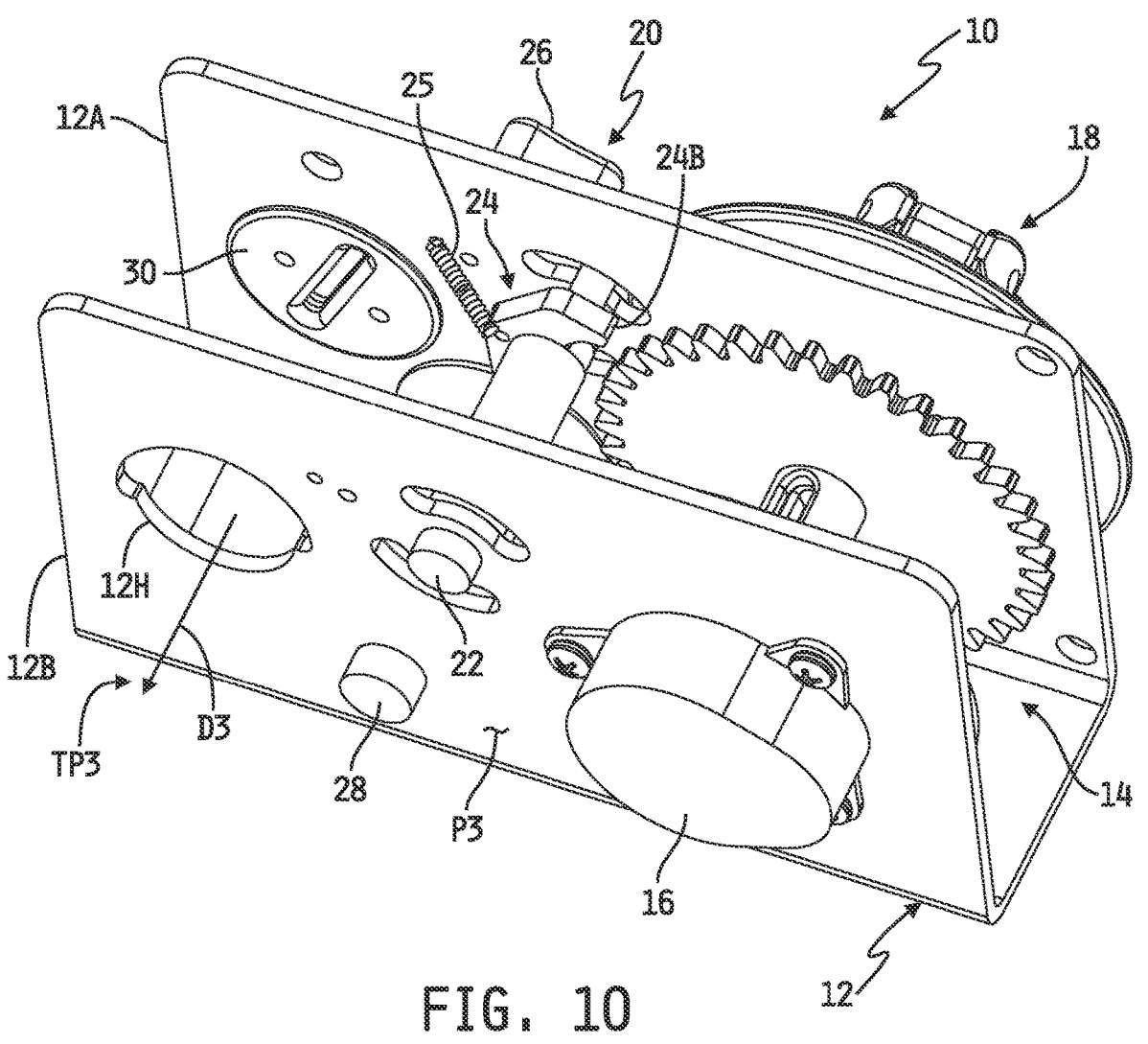
FIG. 10 is a rear perspective view of the web retractor of FIG. 9 with the mode selection switch in the free spooling position.

As the mode switch 26 is rotated to the free spooling or free position, the legs 24F and 24G of the pawl 24 travel along the respective channels 121, 12J defined through the side wall 12A of the frame to draws both of the legs 24A, 24B away from the teeth of the toothed wheel 14B as illustrated by example in FIG. 10. As depicted in FIGS. 11A and 11B, the protrusion 26E extending from the mode switch handle 26 aligns with the detent socket 12K in the free position of the mode switch 26. In this position, the biasing member 25 acting between the pawl 24 and the side wall 12A of the frame 12 applied a biasing force to the mode switch 26 in a direction toward the outer surface of the side wall 12A, thus drawing the protrusion 26E into the detent socket 12K. The mode switch handle 26B can then be released and the mode switch 26 will be maintained in the free spooling position unless and until the handle 26 is rotated to the ratchet or drag positions.

Figure 12:
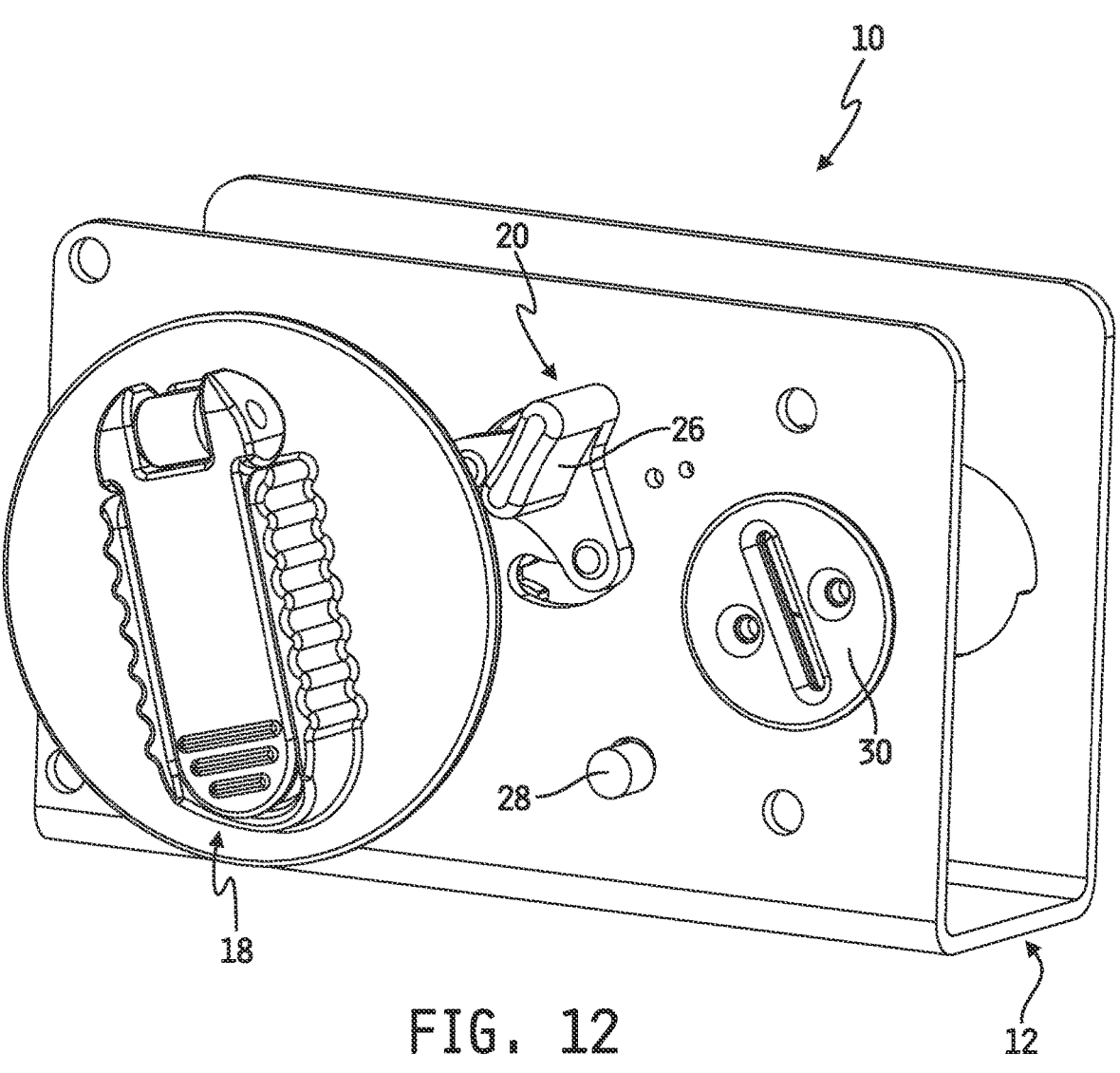
FIG. 12 is a front perspective view similar to FIGS. 7A, 7B and 9, and showing the web retractor with the mode selection switch in a drag position.

In the drag mode of the web retractor 10, the pawl 24 engages the toothed wheel 14B of the spool 14 in a manner which applies rotational resistance, i.e., drag, to the spool 14 in both the web payout and web take up directions. The drag mode of operation is illustrated by example in FIGS. 12-14, wherein the mode switch 26 is manually moved to the drag position as best shown in FIG. 12, e.g., by manually rotating the mode switch handle 26B to its most counterclockwise position.

Figure 13:
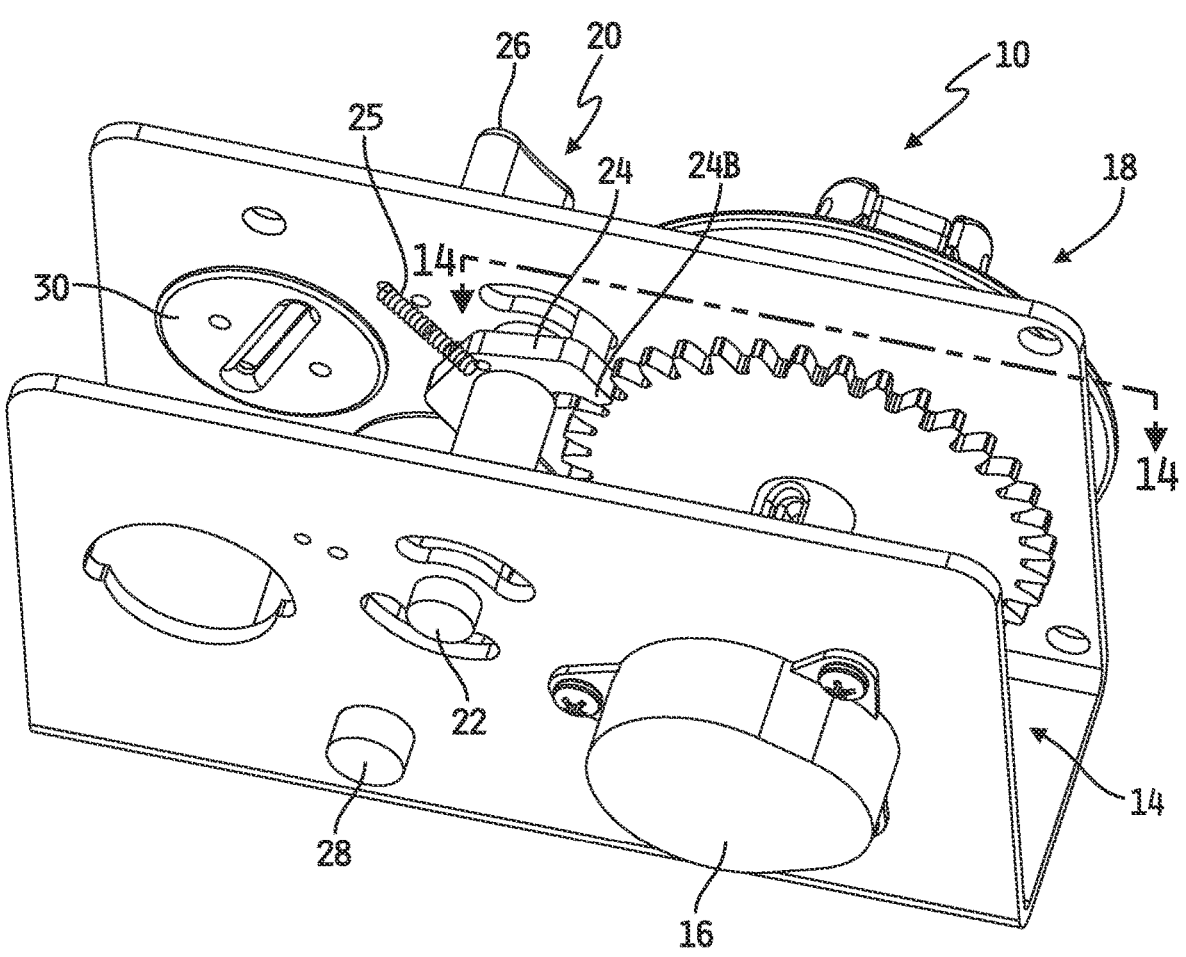
FIG. 13 is a rear perspective view of the web retractor of FIG. 12 with the mode selection switch in the drag position.
Figure 14:
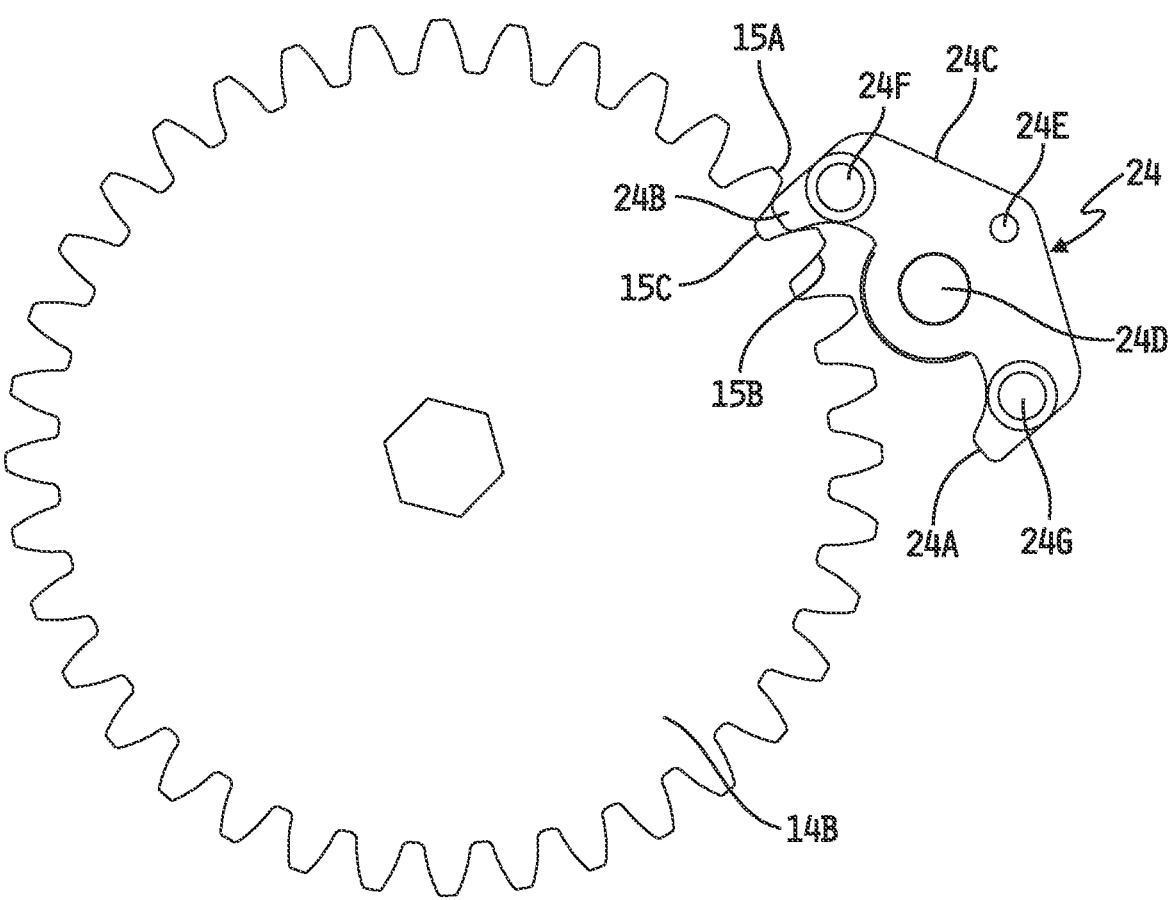
FIG. 14 is a simplified cross-sectional view of the web retractor of FIG. 13 as viewed along section lines 14-14 thereof.
Figure 16:
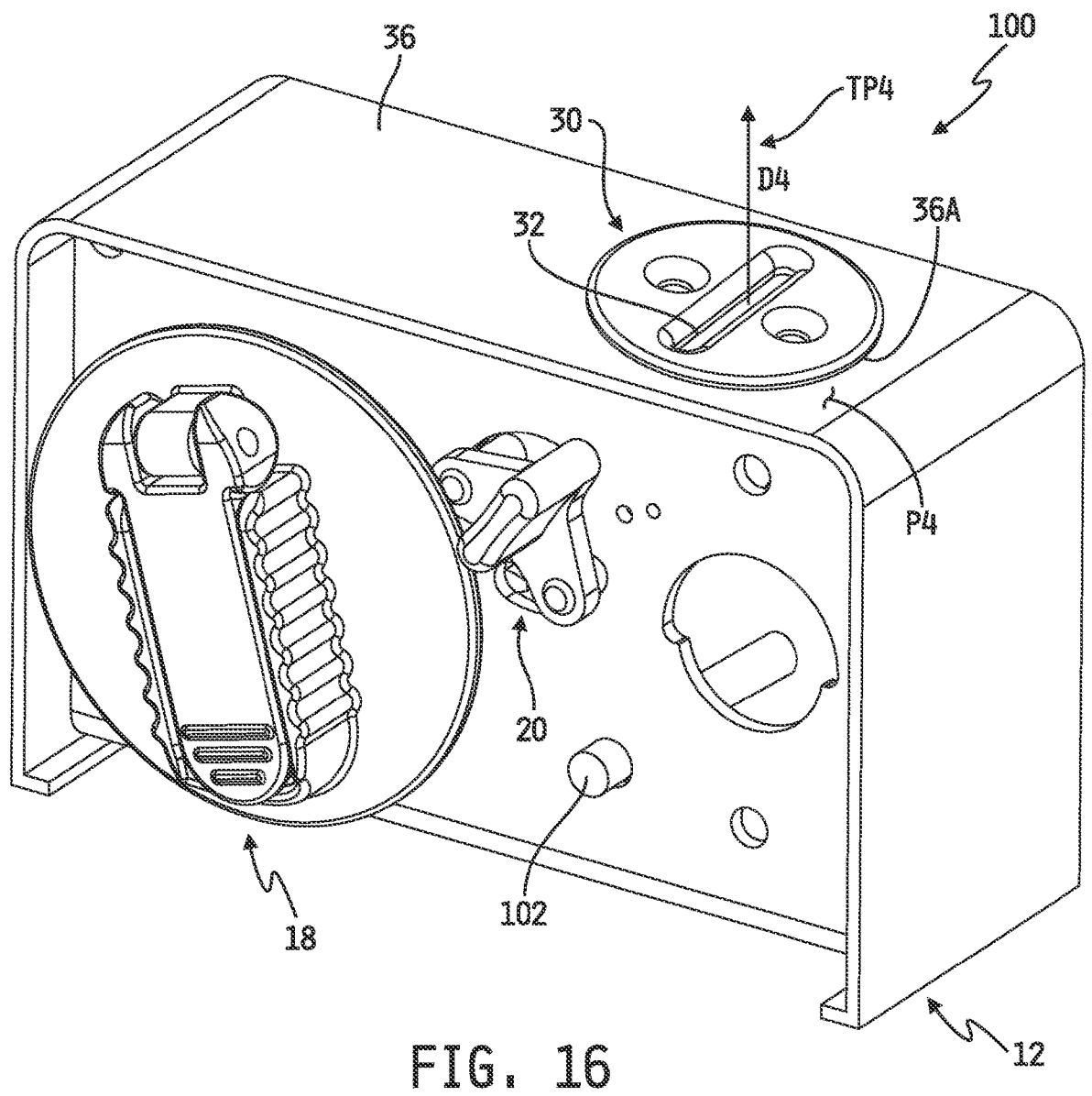
FIG. 16 is a front perspective view of yet another embodiment of a web retractor and illustrating an embodiment of the internal web guide for guiding the web through a top web exit of the retractor.

As the mode switch 26 is rotated to the drag position, the pins 24F and 24G of the pawl 24 travel along the respective channels 12I, 12J defined through the side wall 12A of the frame (e.g., see FIGS. 12 and 13), which forces the free end of the leg 24B of the pawl 24 against the toothed wheel 14B of the spindle 14, as illustrated in FIG. 13, and into a channel 15C defined between two adjacent teeth 15A, 15B of the toothed wheel 14B as also illustrated in FIG. 16. The pawl 24, in the drag position of the mode switch 26, is positioned relative to the shaft 22, the leg 24B of the pawl 24 is positioned relative to the wheel 14B and the pawl 24 is shaped (see, e.g., FIG. 14) all so as to maintain the leg 24B of the pawl 24 in contact with the wheel 14B, but to also allow the leg 24B ride over the teeth of the wheel 14B in at least the web payout direction of the spool 14 (counterclockwise direction of the wheel 14B as seen in FIG. 14). As force, sufficient to overcome the biasing force applied to the spool 14 by the power spring 16, is applied to the web 40 to draw more of the web 40 out of the retractor 10, the leg 24B rides over the teeth of the wheel 14B as the wheel 14B rotates the spool 14 in the web payout direction (counterclockwise direction of the wheel 14B in FIG. 14). In some embodiments, the pawl 24 is configured to, in the drag position, illustrated in FIG. 14, prevent the wheel 14B, and thus the spool 14, from rotating in the web take up direction. In this embodiment, this mode thus allows, for example, web 40 to be drawn from the retractor 40 and then released without being taken up on the spool under the force of the power spring 16 unless and until the mode switch 26 is moved away from the drag position. In alternate embodiments, the pawl 24 may be configured, in the drag position illustrated in FIG. 14, to apply an amount of rotational resistance or drag to the wheel 14B such that, the spool 14 may rotate in the web take up direction under the force of the power spring 16, but more slowly than would otherwise occur in the absence of such rotational resistance.

It will be understood that the three operational modes of the web retractor 10 illustrated in FIGS. 1-14 and described above are provided only by way of example, and that in alternate embodiments the web retractor 10 may be configured to operate in more or fewer operational modes. Additional operational modes may be or include, but are not limited to, for example, a bi-directional locked mode in which the spool 14 is prevented from rotating in either the web payout or web take up directions, a web pay out mode in which the spool 14 is prevented from rotating in the web take up direction but is freely rotatable, against only the biasing force of the power spring 16, in the web pay out direction, or the like.

Figure 15:
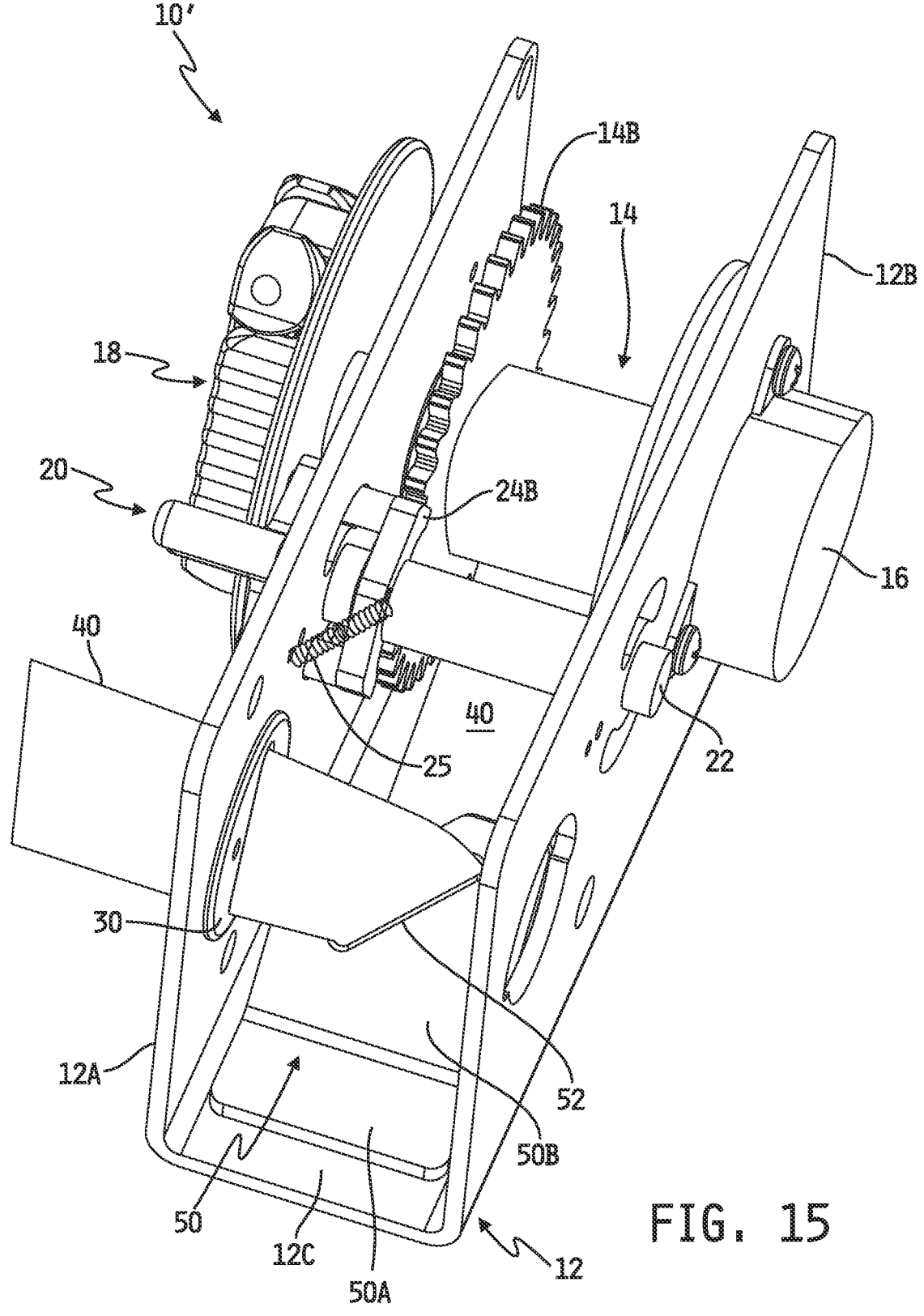
FIG. 15 is a rear perspective view of another embodiment of a web retractor shown with the cover and face plate removed to illustrate various components of the web retractor and a restraint web operatively coupled to the web retractor, and illustrating another embodiment of the internal web guide for guiding the web through a side web exit of the retractor.

Referring now to FIG. 15, an alternate embodiment of a web retractor 10' is shown. The web retractor 10' illustratively has many of the structural features illustrated and described with respect to the web retractor 10, and like numbers are therefore used to identify like components. The web retractor 10' differs from the web retractor 10 in the structure of the web deflector. In the embodiment illustrated in FIG. 15, the web deflector is illustratively provided in the form of an angled bracket 50 having a bracket base 50A mounted, i.e., affixed, to the base 12C of the frame 12 between the side walls 12A, and a bracket flange 50B extending upwardly away from the base 50A. The flange 50B illustratively defines an angled slot 52 therethrough sized to allow passage of the web 40 therethrough. Illustratively, the angle between the exposed faces of the bracket base 50A and the bracket flange 50B is greater than 90 degrees, although in other embodiments this angle may be normal or less than 90 degrees. The slot 52 illustratively forms an angle of approximately 45 degrees relative to vertical in the embodiment depicted in FIG. 15, although in other embodiments this angle may be greater or less than 45 degrees.

Figure 17:
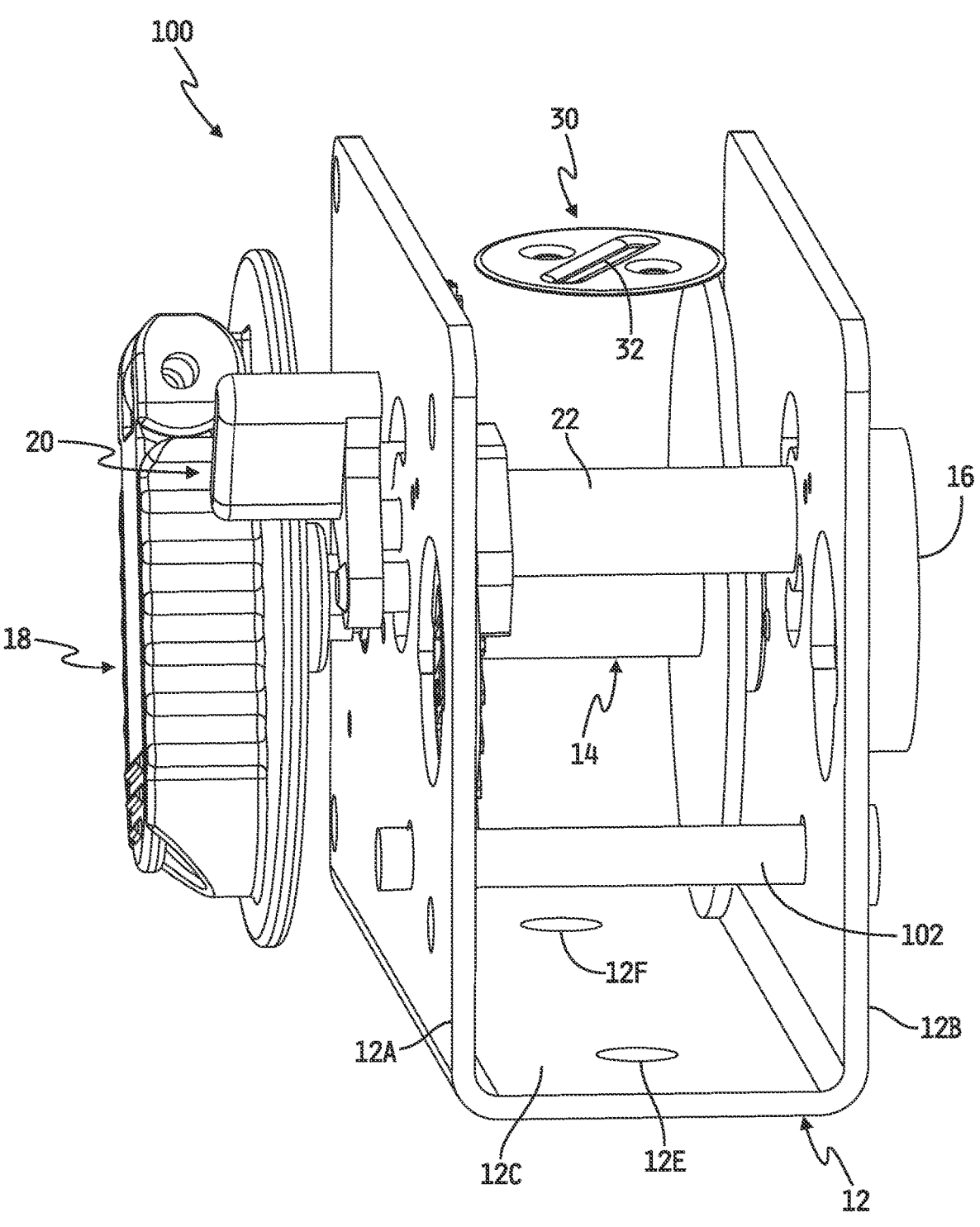
FIG. 17 is a rear perspective view of the web retractor of FIG. 16 shown with the cover and the face plate removed.

Referring now to FIGS. 16 and 17, yet another embodiment of a web retractor 100 is shown. The web retractor 100 illustratively includes a number of the structural features illustrated and described with respect to the web retractor 10, and like numbers are therefore used to identify like components. The web retractor 100 differs from the web retractor 10 in that the web retractor 100 is configured to route the web 40 through the top of the housing 36 rather than through the side wall 12A as in the web retractor 10 illustrated in FIGS. 1-14. In the embodiment illustrated in FIGS. 16-17, the web guide 30 is operatively mounted to the top of the housing 36 in an opening 36A formed therethrough to guide the web 40 along a direction D4 and along a corresponding travel path TP4 that is generally parallel with a plane P4 defined by the outer surface of the top of the housing 36 as illustrated by example in FIG. 16, wherein the direction D4 is generally perpendicular to the direction D1, and the travel path TP4 is likewise perpendicular to the travel path TP1. In such embodiments, the web deflector may be provided in the form of a cylindrical shaft 102 suitably positioned and mounted between the side walls 12A, 12B to direct and guide the web 40 from the spool 14 upwardly through the slot 32 defined through the web guide 30 as illustrated by example in FIG. 17. In alternate embodiments which do not include the housing 36, or which do not include the top of the housing 26, the web guide 30 may be omitted and the web 40 instead enters and exits the web retractor 100 via the open top of the frame 12.

Figure 18:
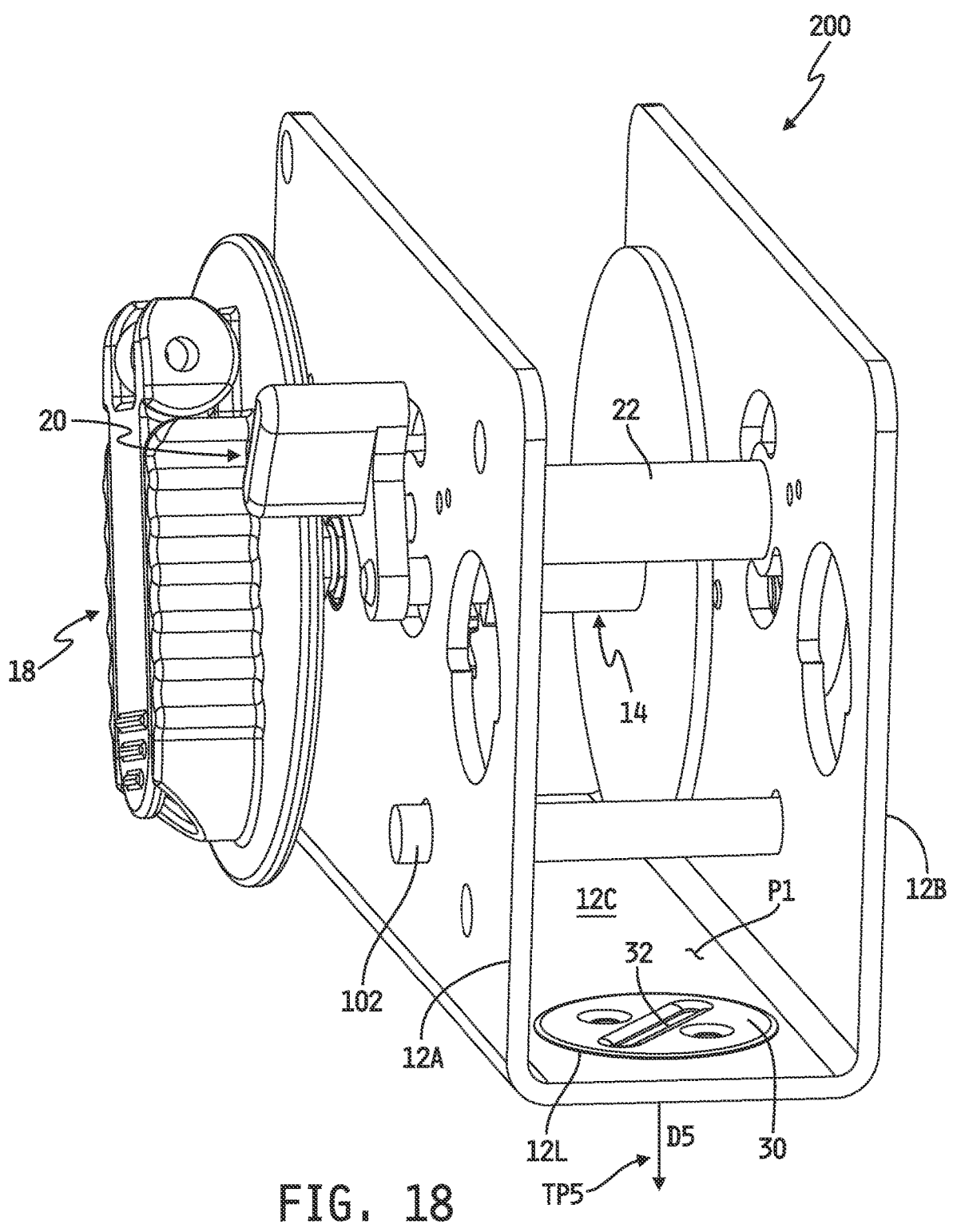
FIG. 18 is a rear perspective view of still another embodiment of a web retractor shown with the cover and face plate removed to illustrate various components of the web retractor, and illustrating an embodiment of the internal web guide for guiding the web through a bottom web exit of the retractor.

Referring now to FIG. 18, still another embodiment of a web retractor 200 is shown. The web retractor 200 illustratively includes a number of the structural features illustrated and described with respect to the web retractor 10, and like numbers are therefore used to identify like components. The web retractor 200 differs from the web retractor 10 in that the web retractor 200 is configured to route the web 40 through the bottom wall 12C of the frame 12 rather than through the side wall 12A as in the web retractor 10 illustrated in FIGS. 1-14. In the embodiment illustrated in FIG. 18, the web guide 30 is operatively mounted to the bottom wall 12C of the housing 12 in an opening 12L formed therethrough to guide the web 40 along a direction D5 and along a corresponding travel path TP5 that is generally perpendicular to the plane P1 defined by the bottom wall 12C of the housing 36 as illustrated by example in FIG. 18, wherein the direction D5 is generally perpendicular to the direction D1, and the travel path TP5 is likewise perpendicular to the travel path TP1. In such embodiments, the web deflector may be provided in the form of the cylindrical shaft 102 suitably positioned and mounted between the side walls 12A, 12B to direct and guide the web 40 from the spool 14 upwardly through the slot 32 defined through the web guide 30 as also illustrated by example in FIG. 18.

Referring now to FIGS. 19-23, yet another embodiment of a web retractor 300 is shown. In the illustrated embodiment, the web retractor 200 includes a frame 312 having spaced-apart, elongated side walls 312A, 312B, and end walls 312C, 312D mounted to opposite respective ends of the side walls 312A, 312B to form a web channel WCH between the four walls 312A-312D. A spool 314 is disposed within the web channel WCH and includes a spool shaft 314A rotatably mounted to and between the side walls 312A, 3128 at a disc 314B mounted to or adjacent to at least one end of the spool shaft 314A such the disc 314B rotates with the shaft 314A relative to the side walls 314A, 314B. One end of a web is mounted to the spool shaft 314A (not shown in FIGS. 19-21 so as not to obscure the components of the retractor 300) and is routed through the web channel WCH as described above with respect to the embodiments illustrated in FIGS. 1-18. In the embodiment illustrated in FIGS. 19-23, the web retractor 300 is configured for a side web entrance/exit through the side wall 312A, and in this regard a diagonally-disposed web deflector 328, spaced apart from the spool shaft 314A, is mounted to either or both of the side walls 312A, 3128, and a web entrance/exit opening 312A1 is defined through a lower portion of the side wall 312A adjacent to the web deflector 328. In the illustrated embodiment, the web deflector 328 is cylindrical, i.e., circular in cross-section, although in alternate embodiments the web deflector 328 may have other shapes. Moreover, it will be understood that in alternate embodiments, the web retractor 300 may be alternatively configured, e.g., as described above, for entrance/exit of the web to/from the side wall 3128, into/out of the bottom of the frame 312 or into/out of the top of the frame 312.

A conventional power spring assembly 316 is mounted to an outer surface of the side wall 3128 and is operatively coupled to the shaft 314A as described above with respect to the power spring assembly 16. A manually actuatable ratchet handle 318 is mounted via a shaft 319 rotatably mounted to the side walls 312A, 3128 such that the shaft 319 extends transversely through the web channel WCH. The shaft 319 illustratively rotates relative to the side walls 312A, 3128 as the ratchet handle 318 is manually rotated. A locking pawl 324 and a mode switch 326 of a mode switch assembly 320 are likewise mounted via a shaft 322 rotatably mounted to the side walls 312A, 3128 such that the shaft 322 extends transversely through the web channel WCH. The shaft 322 illustratively rotates relative to the side walls 312A, 3128 as the mode switch 326 is manually rotated.

The web retractor 300 illustratively differs from the embodiments illustrated in FIGS. 1-18 in that the components controlling the operating modes and ratcheting of the retractor 300 are mounted to the frame 312 outside of the web channel WCH. In the illustrated embodiment, for example, one end of the spool shaft 314A extends through the side wall 312A, and a toothed wheel or gear 330 is mounted to the spool shaft 314A adjacent to an external surface of the side wall 312A such that the toothed wheel 330 rotates with the spool shaft 314 but does so outside of the web channel WCH. A smaller toothed wheel or gear 332 is mounted to the shaft 319 between the ratchet handle 318 and the external surface of the side wall 312A such that the toothed wheel 332 rotates with the shaft 319 and such that the teeth of the toothed wheel 332 mesh with and engage those of the toothed wheel or gear 330. Via the toothed wheel 332, manual rotation of the ratchet handle 318 thus rotates the toothed wheel 330, and rotation of the toothed wheel 330 likewise rotates the toothed wheel 332 and the ratchet handle 318. The locking pawl 324 is likewise mounted to the shaft 322 adjacent to the external surface of the side wall 312A and, like the locking pawl 24 illustrated in FIGS. 1-18 and described above, the locking pawl 324 includes legs 324A, 324B coupled to and extending from a locking pawl body 324C, wherein the legs 324A, 324B are configured to selectively engage the toothed wheel 330 during different respective operating modes of the web retractor 300. A biasing member 325 is illustratively coupled to and between a projection 324D of the locking pawl 324 and an opening 312E of the frame, and is configured to bias the locking pawl 324 so as to maintain the locking pawl 324 and the mode switch 326, in the selected position.

Figure 19:
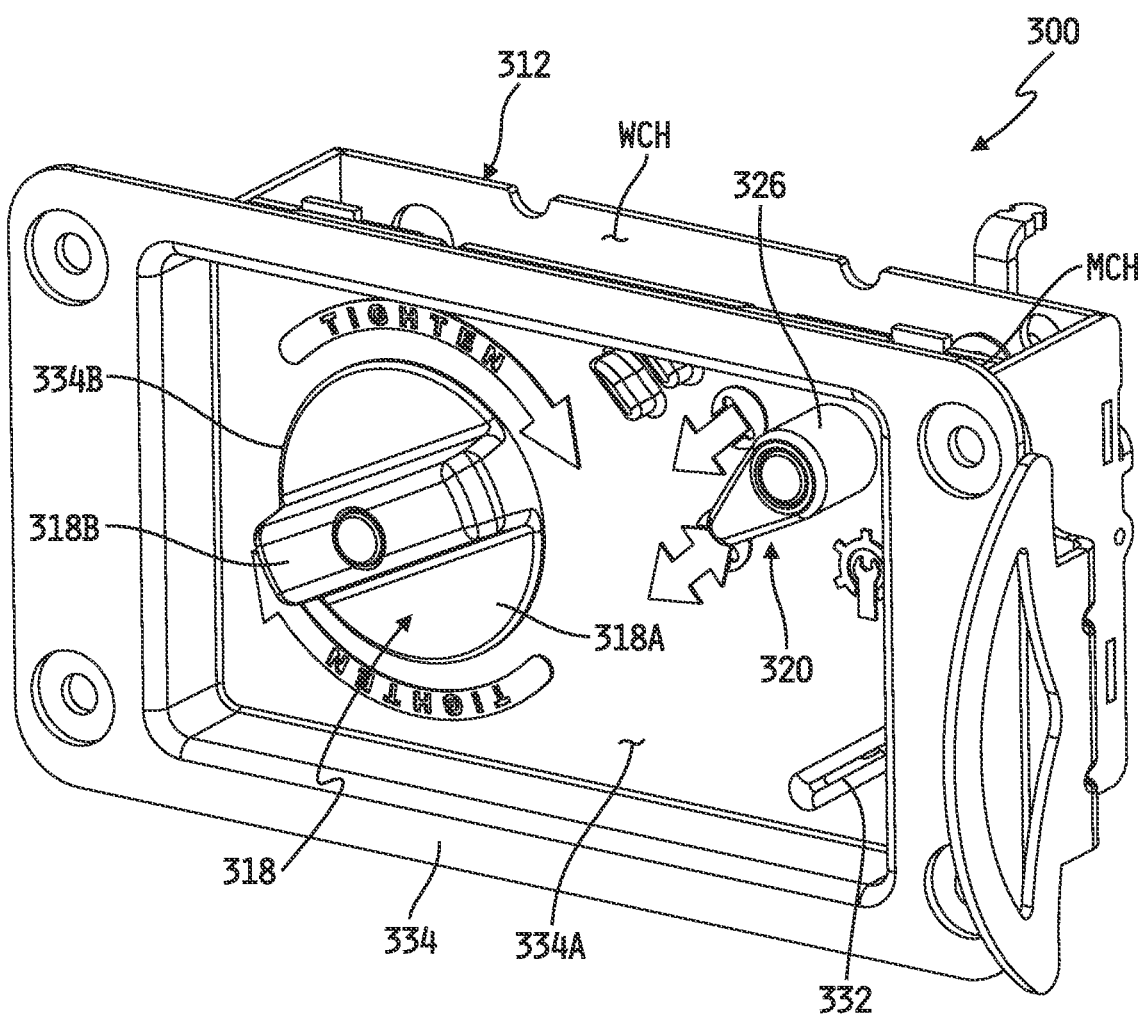
FIG. 19 is a front perspective view of another embodiment of a web retractor with a side web exit shown with a mode selection switch in a free spooling position.

As depicted by example in FIG. 19, the web retractor 300 illustratively includes a face plate 334 mounted at each end to the frame 312. In the illustrated embodiment, the end walls 312C, 312D each extend beyond the side wall 312A and terminate in respective tabs or ears 312C1, 312D1. The face plate 334 is mounted at each end to a respective tab or ear 312C1, 312D1 such that the face plate 334 is spaced laterally or transversely apart from the side wall 312A so as to define a mode channel MCH therebetween in which the components 328, 320 330 controlling the operating modes and ratcheting of the retractor 300, as described above, are disposed. In the example depicted in FIG. 19, the face plate 330 illustratively defines a slot 332 therethrough which aligns with the opening 312A1 and is sized such that the web passes through the face plate 334 and is accessible via the external face 334A of the face plate 334. In the illustrated embodiment, the position and orientation of the slot 332 is fixed, although in alternate embodiments the slot 332 may be replaced with an automatically adjusting or manually adjusting web guide such as the web guide 30 illustrated in FIGS. 1-18 and described above or equivalent thereof, or with a conventional or custom web guide with similar functionality.

The face plate 330 further illustratively defines an opening 334B therethrough sized and configured to receive the retractor handle 318. In the illustrated embodiment, the ratchet handle 318 has a cylindrical body 318A and a handle grip 3188 projecting outwardly from the body 318A, and the opening 334B is illustratively sized to receive the outer periphery of the body 318A therein. A similar opening (not shown) is formed through the face plate 334 at the site of the mode switch 326, and is sized and configured to receive a post of the mode switch 326 therethrough such that the mode switch 326 resides adjacent to the external surface 334A of the face plate 334. As depicted by example in FIG. 19, the external surface of the face plate 334 is provided with symbols or other graphics depicting the three operating modes of the web retractor 300; e.g., a single-headed arrow for the drag mode, a double-headed arrow for the free spooling mode and a wrench and gear combination for the ratchet mode, and the mode switch 326 is manually rotatable between the three operating mode positions. In alternate embodiments, the web retractor 300 may be equipped with more or fewer such operating modes.

Figure 20:
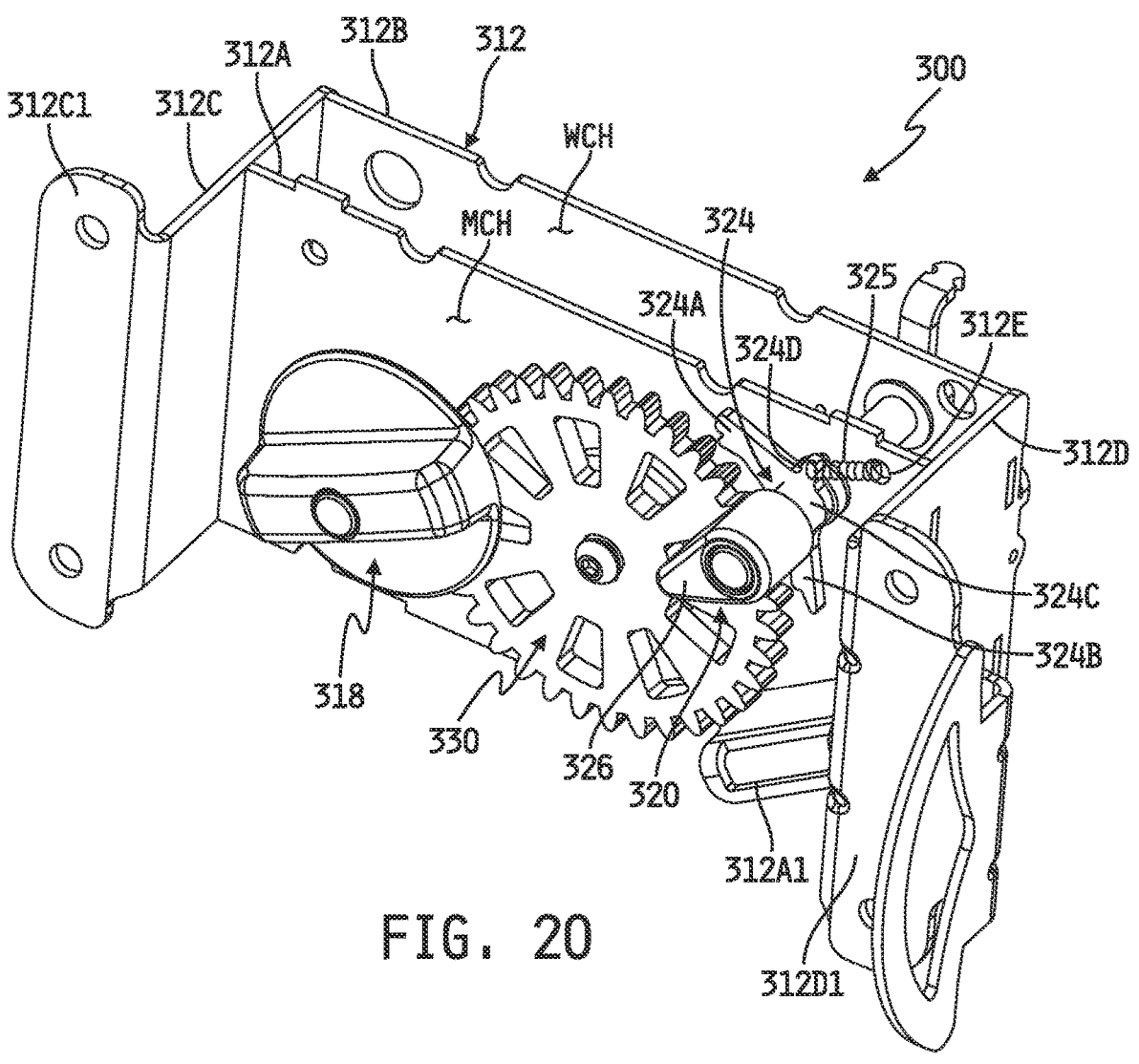
FIG. 20 is a front perspective view similar to FIG. 19 but with the face plate removed to illustrate some of the components of the web retractor.
Figure 21:
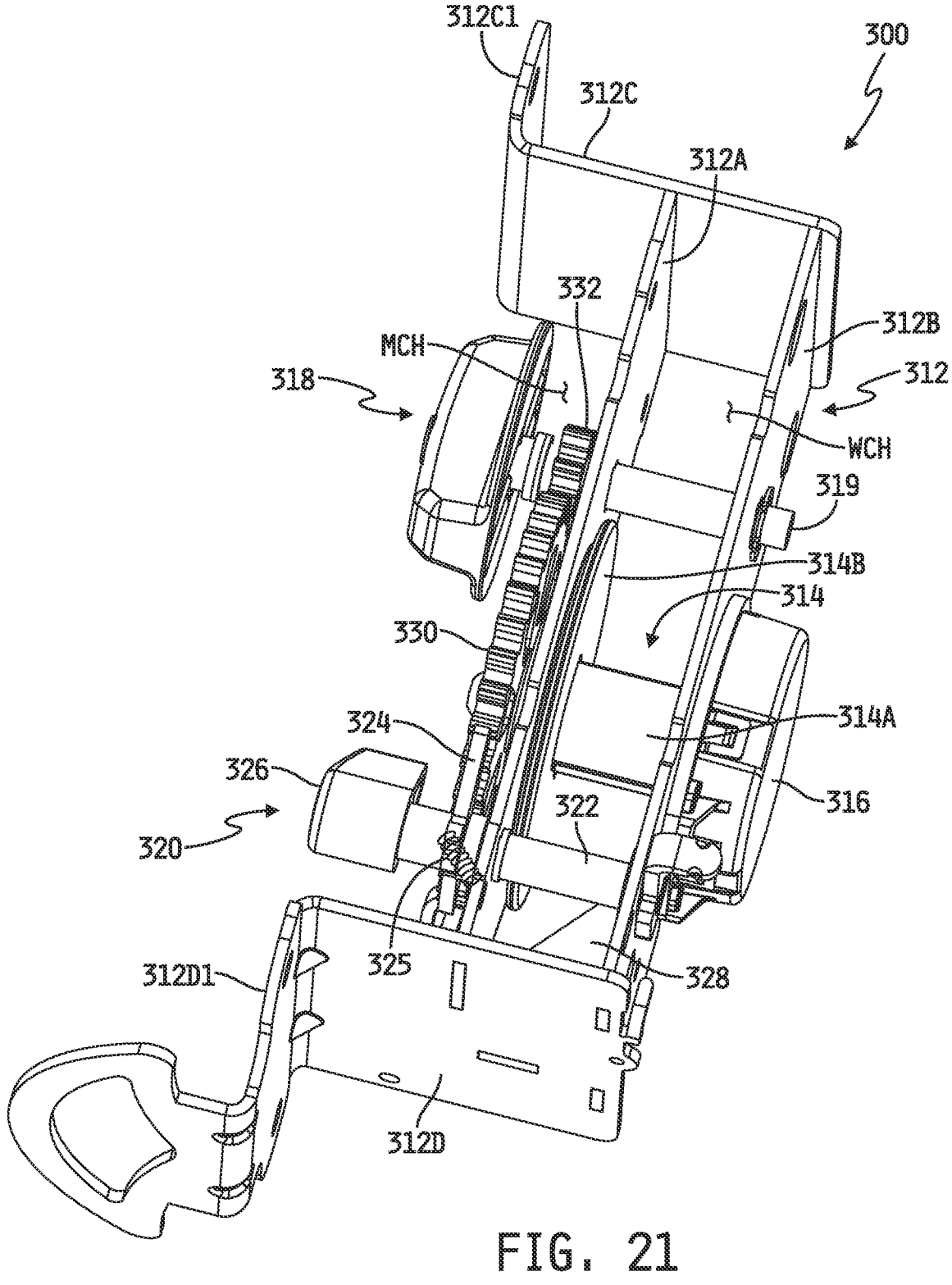
FIG. 21 is a top perspective view of the web retractor of FIGS. 19 and 20 illustrate additional components of the web retractor.
Figure 22:
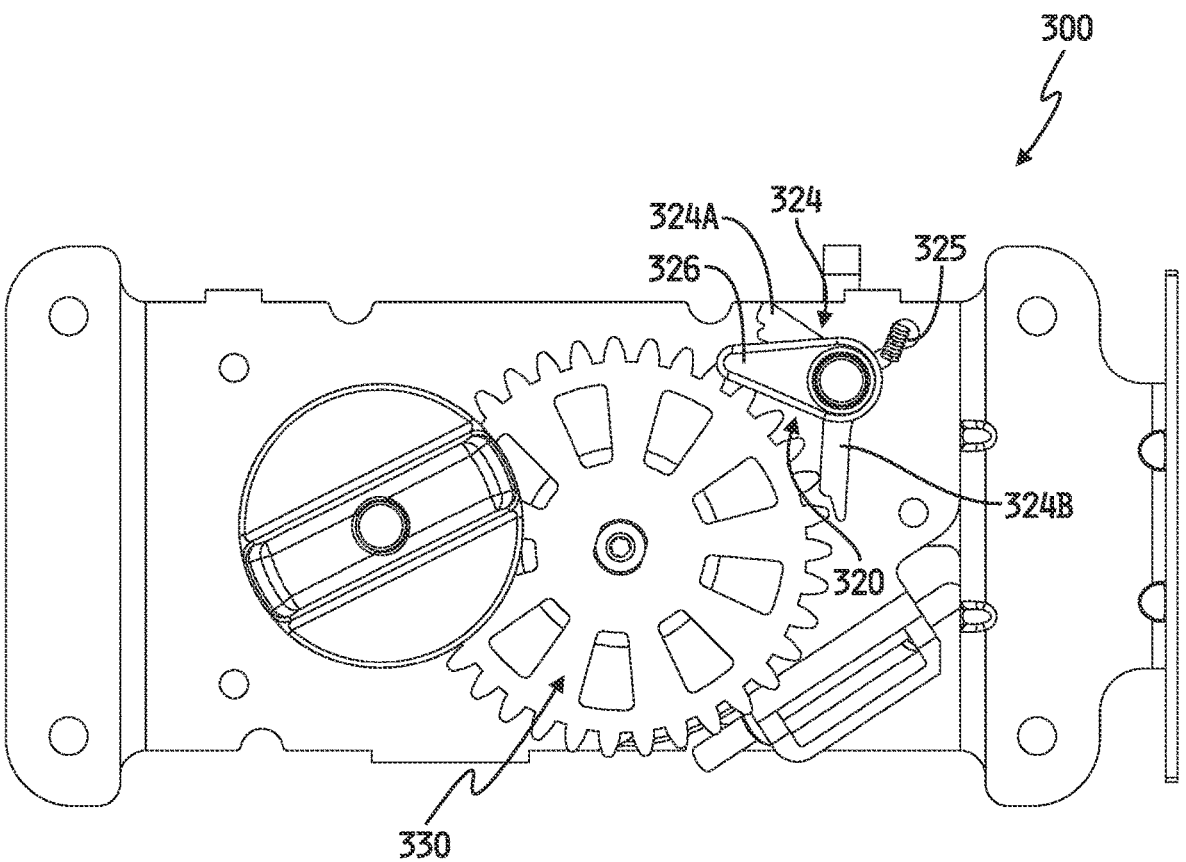
FIG. 22 is a front plan view of the web retractor of FIGS. 19-21 illustrating the mode switch in the drag position.
Figure 23:
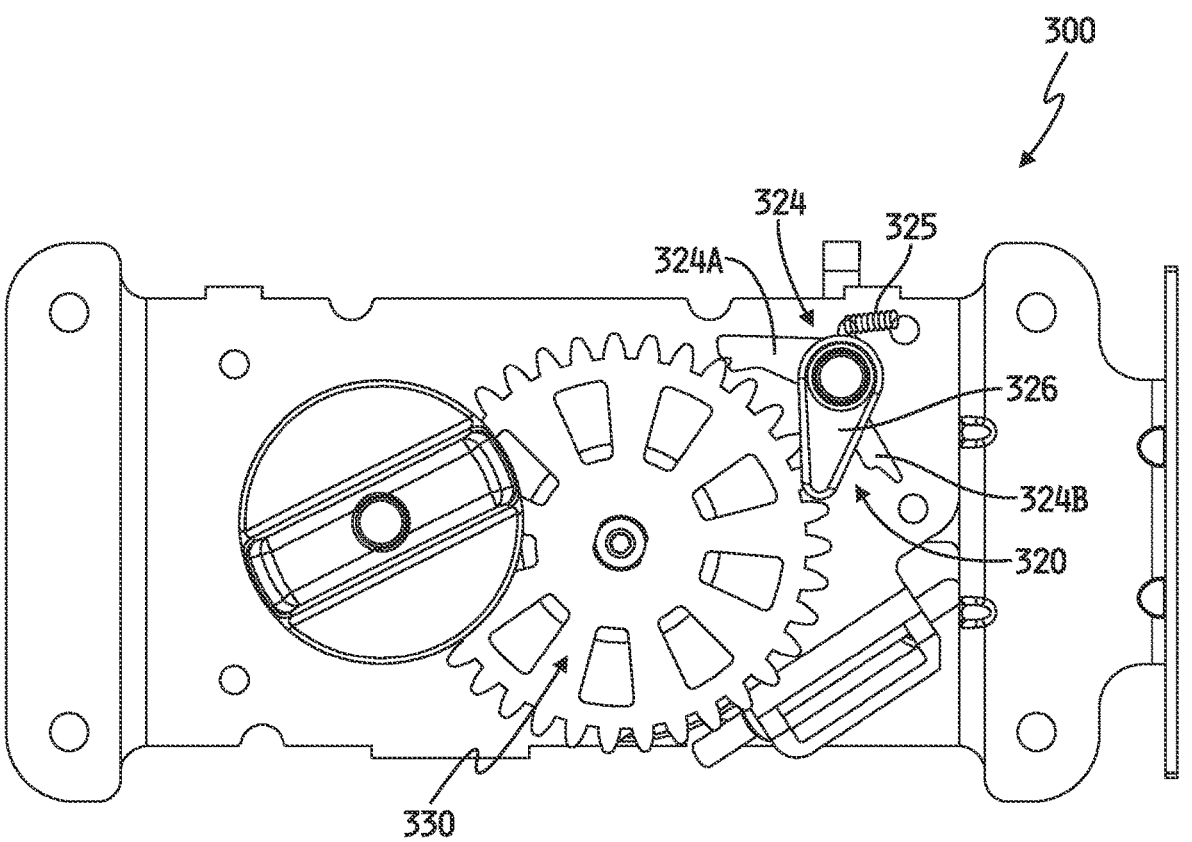
FIG. 23 is another front plan view of the web retractor of FIGS. 19-21 illustrating the mode switch in the ratchet position.

In any case, the free-spooling mode is illustrated by example in FIGS. 19-20 in which the mode switch 326 is positioned in the free-spooling position. In the free-spooling mode, the two legs 324A, 324B of the locking pawl 324 are both disengaged from the toothed wheel so that the web may be freely taken up on and paid out by the spool 14 as described above with respect to the embodiments illustrated in FIGS. 1-18. The drag mode is illustrated by example in FIG. 22 in which the mode switch 326 is positioned in the drag position. In the drag mode, the leg 324B is configured to engage the toothed wheel 330 as described above with respect to the embodiments illustrated in FIGS. 1-18. The ratchet mode is illustrated by example in FIG. 23 in which the mode switch 326 is positioned in the ratchet position. In the ratchet mode, the leg 324A is configured to engage the toothed wheel 330 as described above with respect to the embodiments illustrated in FIGS. 1-18. In some embodiments, the external face 334A of the face plate 334 may be provided with one or more symbols or other graphics, e.g., arrows and/or text, indicating the direction of rotation of the ratchet handle 318 for tightening of the web.

Figure 24:
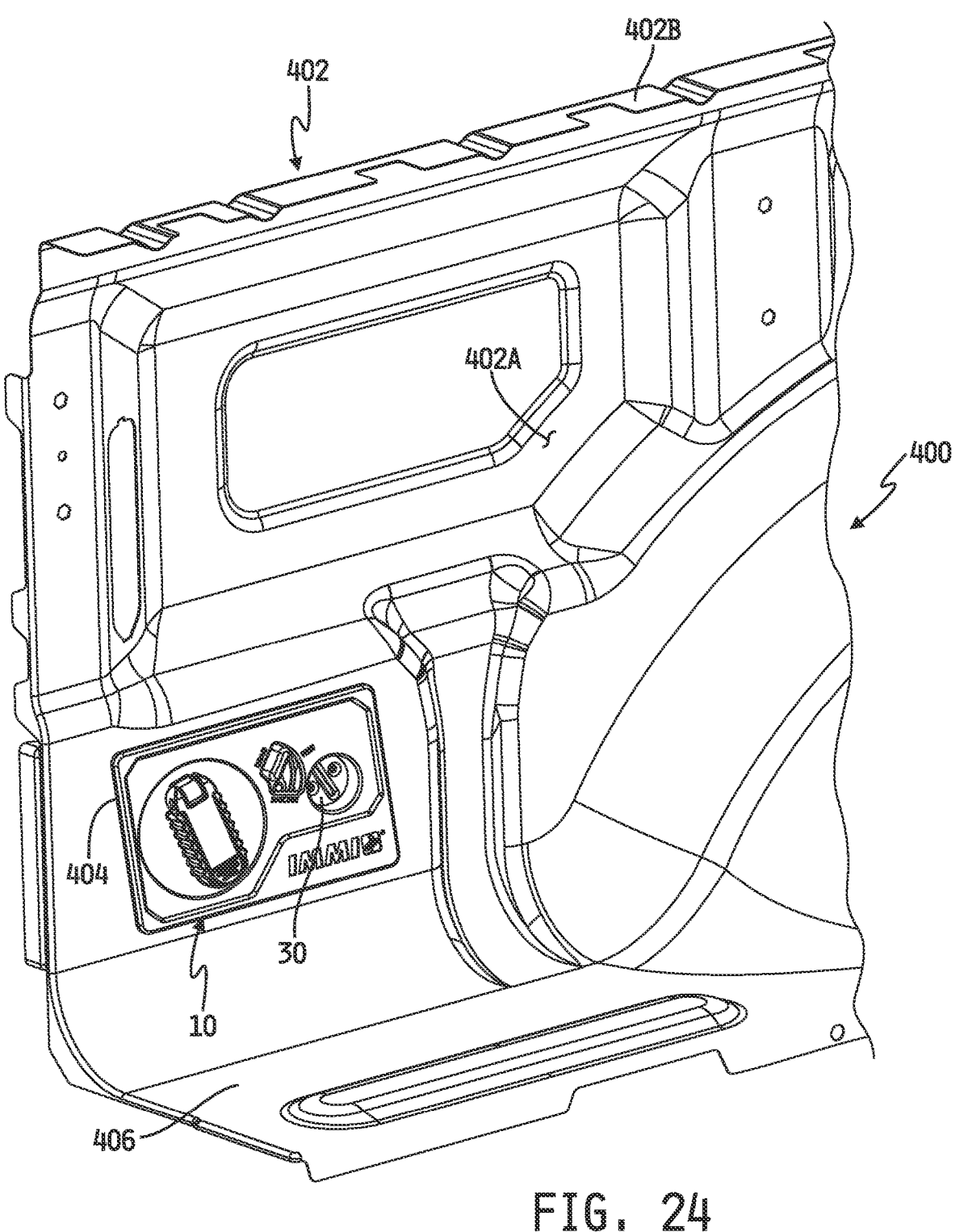
FIG. 24 is a rear perspective view of an embodiment of a securement system for a motor vehicle including any of the web retractor embodiments of FIGS. 1-15 mounted to and within an inner side wall of one side of a pickup truck bed.

Referring now to FIG. 24, an example implementation of the web retractor 10 is shown mounted to an inner side wall 402A of a side 402 of a pickup truck 400. In the illustrated embodiment, the web retractor 10 is mounted within an opening 404 formed through the inwardly-facing exterior surface of the inner side wall 402A, and is positioned so as to be adjacent to but spaced apart from the bed 406 of the pickup truck 400 and spaced apart from the top 402B of the side wall 402A of the pickup truck 400. It will be understood, however, that the web retractor 10 may alternatively be configured to be mounted to the outwardly-facing surface of the inner side wall 402A of the side 402 of the pickup truck 300. In any case, it will be further understood that the mounting location of the web retractor 10 on the side wall 402A of the truck 400 illustrated in FIG. 24 is shown only by way of example, and that the web retractor 10 may alternatively be mounted anywhere on or along the side wall 402, along an opposite side wall, on or along the tail gate, on or along the floor or on or along the front wall of the bed area of the pickup truck 400. In the illustrated embodiment, the web guide 30 of the web retractor 10 is mounted to the side wall 12A of the frame 12 so that the web 40 (not shown in FIG. 24) enters and exits the retractor 10 from and through the side wall 12A of the frame 12 as described above. In the illustrated implementation, the web retractor 10 may illustratively be used to secure cargo to and within the bed area of the truck 400. In alternate embodiments, the web retractor 300 may be similarly mounted to the truck 400. In some embodiments the retractor 10, 300 is sized and configured such that the face plate 34, 334 is flush with the inwardly-facing external surface of the side wall 402A of the truck 400, i.e., the exterior surface of the inner side wall 402A that faces the bed of the truck 400, as depicted by example in FIG. 24, although in alternate embodiments the retractor 10, 300 may be sized and configured such that the face plate 34, 334 is recessed relative to the inwardly-facing external surface of the side wall 402A or such that at least the face plate 34, 334 of the retractor 10, 300 projects outwardly away from the inwardly-facing external surface of the side wall 402A of the truck 400.

Figure 25:
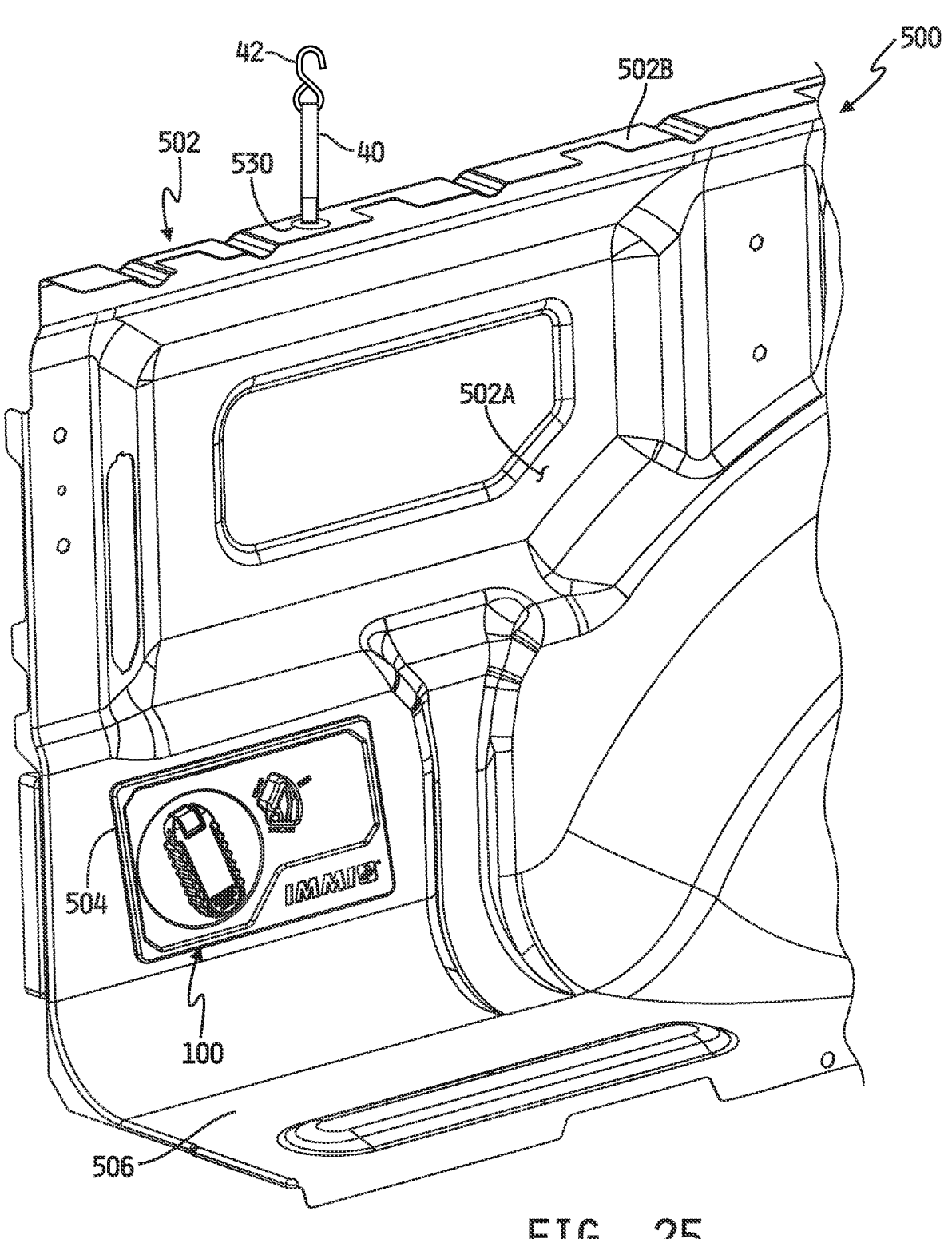
FIG. 25 is a rear perspective view of another embodiment of a securement system for a motor vehicle including the web retractor embodiment of FIGS. 16 and 17 mounted to and within an inner side wall of one side of a pickup truck bed and with the free end of the web extending from a top surface of the side of the pickup truck bed.

Referring now to FIG. 25, an example implementation of the web retractor 100 is shown mounted to an inner side wall 502A of a side 502 of a pickup truck 500. In the illustrated embodiment, the web retractor 100 is mounted within an opening 504 formed through the inwardly-facing exterior surface of the inner side wall 502A, and is positioned so as to be adjacent to but spaced apart from the bed 506 of the pickup truck 500 and spaced apart from the top 502B of the side wall 502A of the pickup truck 500. It will be understood, however, that the web retractor 100 may alternatively be configured to be mounted to the outwardly-facing interior surface of the inner side wall 502A of the side 502 of the pickup truck 500. In any case, it will be further understood that the mounting location of the web retractor 100 on the side wall 502A of the truck 500 illustrated in FIG. 25 is shown only by way of example, and that the web retractor 100 may alternatively be mounted anywhere on or along the side wall 502, along an opposite side wall, on or along the tail gate, on or along the floor or on or along the front wall of the bed area of the pickup truck 500. The web guide 30 of the web retractor 100 is mounted to the top of the housing 36, as illustrated in FIGS. 16 and 17 and described above, so that the web 40 enters and exits the retractor 100 through the top of the housing 36 of the web retractor 100. In the embodiment illustrated in FIG. 25, the web retractor 100 is mounted as described with respect to the embodiment illustrated in FIG. 24; however, because the web 40 enters and exits the web retractor 100 through the top of the housing 36, an additional web guide 530 is illustratively mounted in an opening formed through the top 502B of the side wall 502 of the pickup truck 500 such that the web 40 enters and exits the side wall 502 of the pickup truck 500 via a slot defined through the web guide 530 mounted to the top 502B of the side wall 502. In alternate embodiments in which the web retractor 100 does not include the housing 36, or does not include at least the top portion of the housing 36, the web 40 may enter and exit the retractor 100 via the open top of the frame channel CH. In some alternate embodiments, the web retractor 100 may be replaced with the web retractor 300 suitably modified for web entrance/exit via the top of the frame 312. In any case, the web retractor 100, 300 may illustratively be used to secure cargo to and within the bed area of the truck 500, and such embodiments a conventional hook 42 is shown affixed to the free end of the web 40 for securing the free end of the web 40 to cargo, to a portion of the truck bed, to one or more structures carried by and/or secured to the truck bed, or the like. In some embodiments the retractor 100, 300 is sized and configured such that the face plate 34, 334 is flush with the inwardly-facing external surface of the side wall 502A of the truck 500, i.e., the exterior surface of the inner side wall 502A that faces the bed of the truck 500, as depicted by example in FIG. 25, although in alternate embodiments the retractor 10, 300 may be sized and configured such that the face plate 34, 334 is recessed relative to the inwardly-facing external surface of the side wall 502A or such that at least the face plate 34, 334 of the retractor 10, 300 projects outwardly away from the inwardly-facing external side wall 502A of the truck 500.

Figure 26:
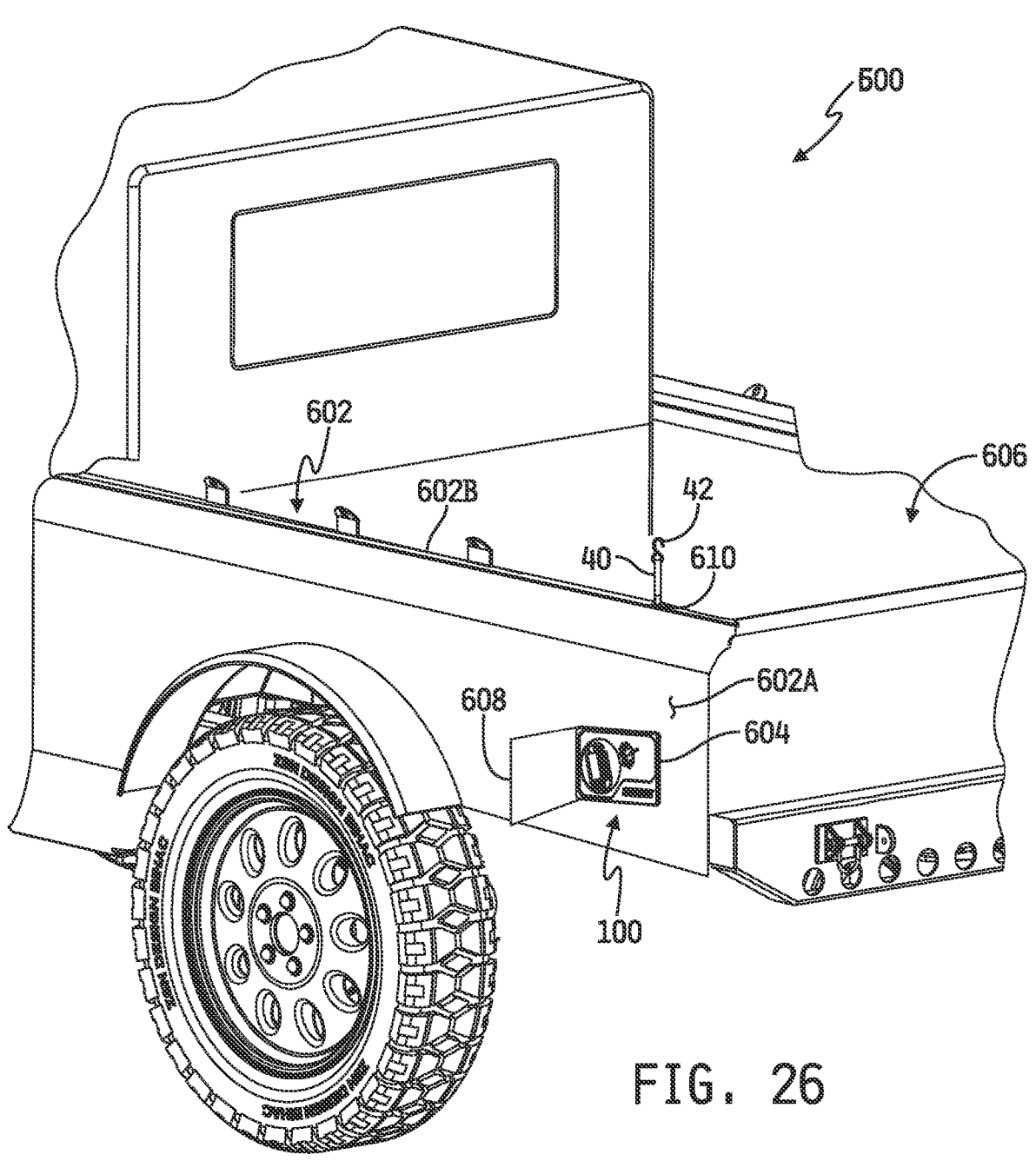
FIG. 26 is a rear perspective view of yet another embodiment of a securement system for a motor vehicle including the web retractor embodiment of FIGS. 16 and 17 mounted to and within an outer side wall of one side of a pickup truck bed and with the free end of the web extending from a top surface of the side of the pickup truck bed.

Referring now to FIG. 26, another example implementation of the web retractor 100 is shown mounted to an outer side wall 602A of a side 602 of a pickup truck 600. In the illustrated embodiment, the web retractor 100 is mounted within an opening 604 formed through the outwardly-facing external surface of the outer side wall 602A, and is positioned so as to be adjacent to but spaced apart from a plane defined by the bed 606 of the pickup truck 600 and spaced apart from the top 602B of the side wall 602A of the pickup truck 600. In some embodiments, a closure 608 is provided for selectively covering the web retractor 100 as depicted by example in FIG. 26. In some embodiments, the retractor 100 is sized and configured such that the face plate 34 is flush with the external (outwardly-facing) surface of the side wall 602A of the truck 600, i.e., the exterior surface of the outer side wall 602A that faces away from the truck 600, although in alternate embodiments the retractor 100 may be sized and configured such that the face plate 34 is recessed relative to the external surface of the side wall 602A. In any case, the mounting of the web retractor 100 to the sidewall 602A will take into account and accommodate the closure 608 in embodiments which include the closure 608.

It will be understood that the mounting location of the web retractor 100 on the side wall 602A of the truck 600 illustrated in FIG. 26 is shown only by way of example, and that the web retractor 100 may alternatively be mounted anywhere on or along the side wall 602, along an opposite side wall, on or along the tail gate, or other area of the pickup truck 600. The web guide 30 of the web retractor 100 is illustratively mounted to the top of the housing 36, as illustrated in FIGS. 16 and 17 and described above, so that the web 40 thus enters and exits the retractor 10 through the top of the housing 36 of the web retractor 100. In embodiments in which the housing 36 is omitted, or in which at least the top portion of the housing 36 is omitted, the web guide 30 will likewise be omitted and the web 40 will enter and exit the web retractor via the open top of the frame 12. In the embodiment illustrated in FIG. 26, the web retractor 100 is mounted as described with respect to the embodiment illustrated in FIG. 25 but facing away from the outer wall 602A of the side wall 602; however, because the web 40 enters and exits the web retractor 100 through the top of the housing 36, a slot 610 is formed through the top 602B of the side wall of the pickup truck 600 such that the web 40 enters and exits the side wall 602 of the pickup truck 600 via the slot 610. In alternate embodiments, an additional web guide may be mounted in an opening formed through the top 602B of the side wall 602 of the pickup truck 600 as depicted in FIG. 25. In some alternate embodiments, the web retractor 300, suitably modified for web entrance/exit through the top of the retractor 300, may be used instead of the web retractor 100. In the illustrated implementation, the web retractor 100, 300 may illustratively be used to secure cargo to and within the bed area of the truck 600 as described above with respect to FIGS. 24 and 25.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, whereas FIGS. 24-26 illustrate various implementations of the web retractor described herein in and to a bed area of a pickup truck, those skilled in the art will recognize that such implementations are provided only by way of example and are not to be considered limiting in any way. Indeed, other implementations of the web retractor in or on other types of motor vehicles without limitation in or on any area thereof without limitation are contemplated, and any other such implementations of the web retractor embodiments described herein are intended to fall within the scope of this disclosure. As one example, which should not be considered to be limiting in any way, any of the various embodiments of the web retractor illustrated in the attached figures and described herein may be mounted to any motor vehicle having a cargo area bounded by at least one retaining wall, wherein the at least one retaining wall has an opening defined therein, and wherein the web retractor may be sized and configured to be mounted in such an opening with the face plate flush with or recessed relative to an externally-facing surface of the retaining wall. Such a cargo area may be or be part of an interior area of a motor vehicle and/or an exterior area of the motor vehicle, examples of which may include, but are not limited to, a hatchback area or other area of a motor vehicle accessible via a tail gate, sliding or swinging door, an exterior cargo bed forming part of an on-road and/or off-road motor vehicle, a roof top area of a motor vehicle whether or not equipped with a luggage rack, or the like. Moreover, it will be understood that the term "motor vehicle" used herein should be understood to include any movable vehicle powered by any means, e.g., by an internal combustion engine, by electrical power, or other conventional source of power, as well as any movable vehicle pushed or pulled by a powered vehicle, such as an open, closed or partially closed trailer or other towed vehicle.

What is claimed is:

1. A web retractor, comprising:
a frame including spaced-apart first and second side walls and a bottom wall coupling together the first and second side walls, the frame defining an elongated channel extending from one end of the frame to an opposite end of the frame between the first and second side walls and the bottom wall,
a spool rotatably mounted within the channel to and between the first and second side walls,
a web having one end mounted to the spool, the spool being rotatable to take up and pay out at least some of the web,
a web deflector spaced apart from the spool and mounted within the channel to at least one of the first side wall, the second sidewall and the bottom wall, the web deflector configured to guide the web to and from the spool longitudinally along the channel between the web deflector and the spool, and to guide the web into and out of the frame through the first side wall, the second side wall, or the bottom wall, wherein an opening is defined through the first side wall, the second side wall, or the bottom wall, and
a web guide mounted over the opening, the web guide defining a slot through which the web passes into and out of the frame, and wherein the web guide is rotatable relative to the opening to vary an orientation of the slot and the web relative to the frame,
wherein the opening defines an axis extending through a center thereof, and wherein the web guide is rotatable relative to the opening about the axis.

2. The web retractor of claim 1, wherein the web deflector is configured to guide the web into and out of the frame through the opening defined through the first or second side wall or through the bottom wall.

3. A web retractor, comprising:
a frame including spaced-apart first and second side walls and a bottom wall coupling together the first and second side walls,
a spool rotatably mounted to and between the first and second side walls such that the spool rotates relative to the first and second side walls about a spool axis,
a web having one end mounted to the spool, the spool being rotatable to take up and pay out at least some of the web, and
a web deflector spaced apart from the spool and the bottom wall and mounted to and between the first side wall and the second sidewall, the web deflector configured to guide the web within the frame to and from the spool along a plane normal to the spool axis, and to guide the web into and out of the frame through the first side wall, the second side wall, the bottom wall or through a top of the frame opposite the bottom wall,
wherein an outer surface of the web deflector is spaced apart from the bottom wall by a fixed distance such that the web, guided by the web deflector, is maintained at the fixed distance from the bottom wall at the web deflector,
wherein the web deflector is conically shaped.

4. The web retractor of claim 3, wherein an opening is defined through the first side wall, the second side wall or the bottom wall,
and wherein the web deflector is configured to guide the web into and out of the frame through the opening defined through the first or second side wall or through the bottom wall.

5. The web retractor of claim 3, wherein the top of the frame opposite the bottom wall is open, and further comprising a housing mounted to the frame and having a housing portion disposed over or on the top of the frame,
wherein an opening is defined through the housing portion, and wherein the web deflector is configured to guide the web into and out of the frame through the opening defined through the housing portion.

6. The web retractor of claim 4, further comprising a web guide mounted over the opening, the web guide defining a slot through which the web passes into and out of the frame, wherein the web guide is rotatable relative to the opening to vary an orientation of the slot and the web relative to the frame.

7. A web retractor, comprising:
a frame including spaced-apart first and second side walls and a bottom wall coupling together the first and second side walls,
a spool rotatably mounted to and between the first and second side walls such that the spool rotates relative to the first and second side walls about a spool axis,
a web having one end mounted to the spool, the spool being rotatable to take up and pay out at least some of the web,
a web deflector spaced apart from the spool and mounted to at least one of the first side wall, the second sidewall and the bottom wall, the web deflector configured to guide the web within the frame to and from the spool along a plane normal to the spool axis, and to guide the web into and out of the frame through the first side wall, the second side wall, the bottom wall or through a top of the frame opposite the bottom wall,
a toothed wheel operatively coupled to and rotatable with the spool,
a locking pawl selectively engageable with the toothed wheel,
a ratchet handle operatively coupled to the toothed wheel, and
a mode switch coupled to the locking pawl and manually movable between at least two positions to selectively engage and disengage the locking pawl with and from the toothed wheel respectively,
wherein the spool is rotatable in a web take up direction to take up at least some of the web thereon and is rotatable in a web pay out direction, opposite the web take up direction, to pay out at least some of the web therefrom,
and wherein the at least two positions of the mode switch includes a ratchet position which engages the locking pawl with the toothed wheel in a manner which prevents the spool from rotating in the web pay out direction and which engages the toothed wheel to allow the spool to be rotated by the ratchet handle in the web take up direction.

8. The web retractor of claim 7,
wherein the at least two positions of the mode switch includes a drag position which engages the locking pawl with the toothed wheel in a manner which applies a rotational resistance to and against the toothed wheel.

9. The web retractor of claim 8, wherein the locking pawl is configured to apply the rotational resistance to the toothed wheel in a manner which allows the spool to rotate in the web take up and web pay out directions against the rotational resistance.

10. The web retractor of claim 8, wherein the locking pawl is configured to apply the rotational resistance to the toothed wheel in a manner which allows the spool to rotate in the web pay out direction against the rotational resistance but which prevents the spool from rotating in the web take up direction.

11. The web retractor of claim 7,
wherein the at least two positions of the mode switch includes a free spooling position which disengages the locking pawl from the toothed wheel to allow the spool to rotate in the web take up and pay out directions.

12. The web retractor of claim 3, further comprising a housing having a face plate mounted to one of the first and second side walls of the frame, the web retractor sized and configured to be mounted to a side wall of a bed of a motor vehicle with the face plate flush with or recessed relative to an externally-facing surface of the side wall of the bed.

13. A motor vehicle and web retractor combination, comprising:
a motor vehicle having a cargo area bounded by at least one retaining wall, the at least one retaining wall having an opening defined therein, and
a web retractor according to claim 3, wherein the web retractor is mounted in the opening of the at least one retaining wall with a face plate flush with or recessed relative to an externally-facing surface of the at least one retaining wall.

14. The combination of claim 13, wherein the motor vehicle is a pickup truck, the cargo area is a bed of the pickup truck and the at least one retaining wall is one of a side wall and a tail gate of the pickup truck.

15. The combination of claim 14, wherein the at least one retaining wall is a side wall of the pickup truck,
and wherein the opening defined in the at least one retaining wall comprises an opening defined in a surface of the side wall facing the bed such that the face plate is flush with or recessed relative to the surface of the side wall facing the bed.

16. The combination of claim 14, wherein the at least one retaining wall is a side wall of the pickup truck,
and wherein the opening defined in the at least one retaining wall comprises an opening defined in an external surface of the side wall facing away from the pickup truck such that the face plate is flush with or recessed relative to the external surface of the side wall facing away from the pickup truck.

17. The combination of claim 13, wherein the web retractor includes the web having the one end operatively mounted in the web retractor and an opposite end extending out of the web retractor through the face plate.

18. The combination of claim 13, wherein the web retractor includes the web having the one end operatively mounted in the web retractor and an opposite end extending upwardly out of the web retractor toward a top of the at least one retaining wall,
and further comprising a slot formed in the top of the at least one retaining wall through which the web extends or a web guide mounted in an opening defined through the top of the at least one retaining wall through which the web extends.

19. The combination of claim 13, wherein the web deflector is configured to guide the web from the spool out of the web retractor through one of the first and second side walls and through the face plate mounted thereto, through the bottom wall or through the top of the frame opposite the bottom wall.

20. The web retractor of claim 1, wherein the web deflector extends between and is mounted directly to the first side wall and the second side wall.

21. The web retractor of claim 1, wherein the opening is defined through the first side wall or the second side wall, and wherein the axis is parallel to the bottom wall.

* * * * *